(12) United States Patent
Ebbes et al.

(10) Patent No.: US 10,361,564 B2
(45) Date of Patent: Jul. 23, 2019

(54) ELECTRICAL POWER DISTRIBUTOR AND METHOD FOR DISTRIBUTING ELECTRICAL POWER

(71) Applicant: GIP AG, Mainz (DE)

(72) Inventors: Alexander Ebbes, Nieder-Olm (DE); Bernd Reifenhäuser, Mainz (DE)

(73) Assignee: GIP AG, Mainz (DE)

( * ) Notice: Subject to any disclaimer, the term of this patent is extended or adjusted under 35 U.S.C. 154(b) by 92 days.

(21) Appl. No.: 15/535,614

(22) PCT Filed: Dec. 15, 2015

(86) PCT No.: PCT/EP2015/079767
§ 371 (c)(1),
(2) Date: Jun. 13, 2017

(87) PCT Pub. No.: WO2016/102241
PCT Pub. Date: Jun. 30, 2016

(65) Prior Publication Data
US 2017/0353032 A1   Dec. 7, 2017

(30) Foreign Application Priority Data

Dec. 22, 2014   (DE) .................. 10 2014 119 431

(51) Int. Cl.
*H02J 3/06* (2006.01)
*H02J 3/46* (2006.01)
(Continued)

(52) U.S. Cl.
CPC ............... *H02J 3/46* (2013.01); *G05B 17/02* (2013.01); *H02J 3/06* (2013.01); *H02J 3/32* (2013.01); *B60R 16/03* (2013.01)

(58) Field of Classification Search
CPC ....... H02J 3/06; H02J 3/32; H02J 3/46; G05B 17/02; B60R 16/03
See application file for complete search history.

(56) References Cited

U.S. PATENT DOCUMENTS 5,874,786 A   2/1999   McVey et al.
9,013,902 B2   4/2015   Abe
(Continued)

OTHER PUBLICATIONS

Abe, Rikiya et al.; "Digital Grid: Communicative Electrical Grids of the Future"; IEEE Transactions on Smart Grid, vol. 2, No. 2, Jun. 2011, (12 pages).
(Continued)

*Primary Examiner* — Daniel J Cavallari
(74) *Attorney, Agent, or Firm* — The Maxham Firm; Lawrence A. Maxham

(57) ABSTRACT

An electrical power distributor for an electricity grid comprising an electrical distributor circuit having at least three terminals, wherein sources and sinks for electrical energy can be connected to the terminals, and wherein the three terminals are electrically connected together in such a way that an electric current can flow from each of the terminals to each of the other terminals. Each of the terminals has a respective power controller which is so adapted that in operation of the power distributor the electric power P(t) flowing by way of the respective terminal can be adjusted in dependence on time t. The control means is connected to each of the power controllers, and it calculates the electric power P(t) flowing by way of each of the terminals in dependence on the data received from the sources or sinks.

15 Claims, 17 Drawing Sheets

(51) Int. Cl.
*H02J 3/32* (2006.01)
*G05B 17/02* (2006.01)
*B60R 16/03* (2006.01)

(56) References Cited

U.S. PATENT DOCUMENTS

| | | | |
|---|---|---|---|
| 9,240,685 B2 | 1/2016 | Rozman et al. | |
| 9,337,655 B2 | 5/2016 | Reifenhäuser et al. | |
| 2010/0264739 A1* | 10/2010 | Errington | H02J 1/10 307/80 |

OTHER PUBLICATIONS

International Search Report (PCT/EP2015/079767), dated Aug. 2, 2016, (2 pages).

* cited by examiner

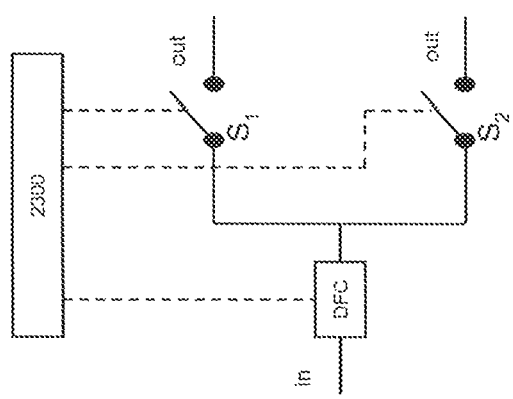
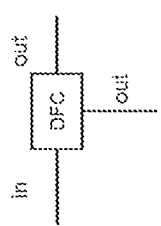
Fig. 12 b)

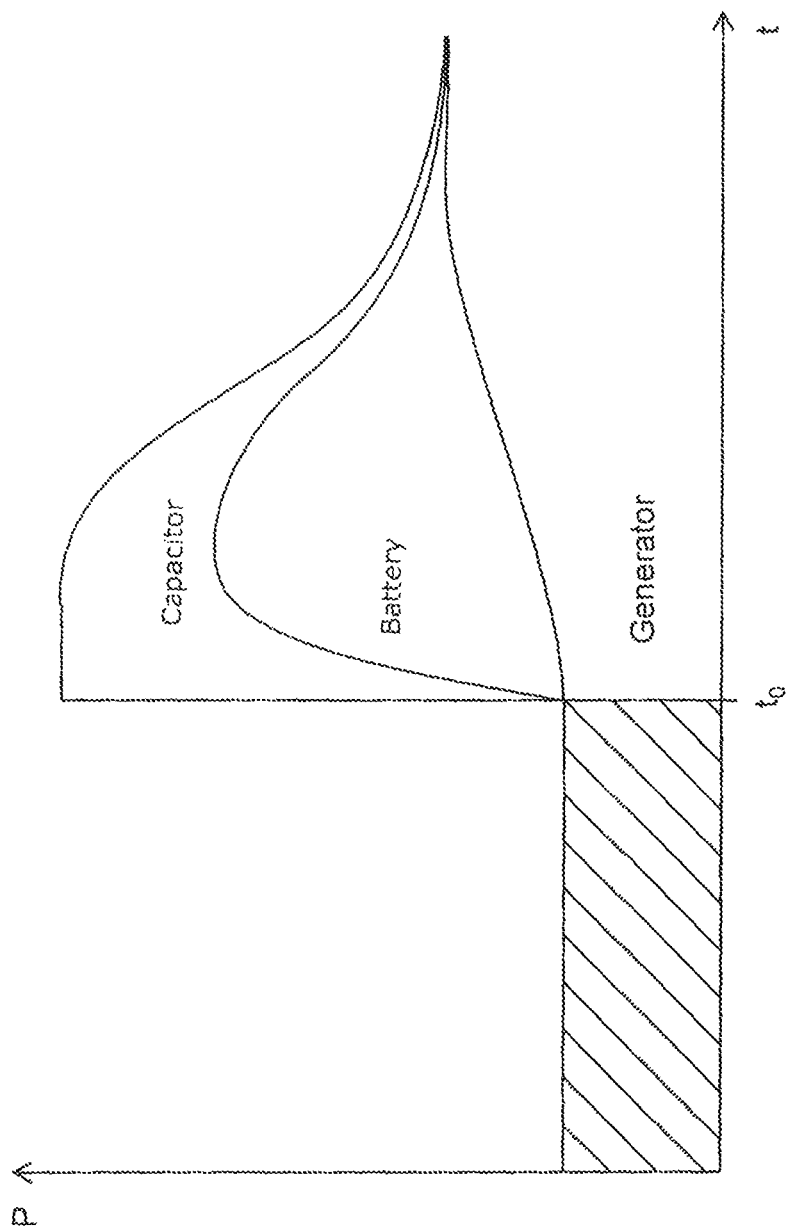

ELECTRICAL POWER DISTRIBUTOR AND METHOD FOR DISTRIBUTING ELECTRICAL POWER

FIELD OF THE INVENTION

The present concept concerns an electrical power distributor for an electricity grid comprising an electrical distributor circuit having at least three terminals, wherein sources and sinks for electrical energy can be connected to the terminals, wherein the three terminals are electrically connected together in such a way that an electric current can flow from each of the terminals to each of the other terminals. A method of distributing electric power in an electricity grid is included.

BACKGROUND OF THE INVENTION

A central element in the use of regenerative energy sources in an electricity grid but also in the energy supply for mobile consumers, for example, motor vehicles with an electric drive, is buffer storage means. They serve to be able to compensate for the volatility in terms of the supply feed of electric power by the sources and consumption by sinks for the electric power. Without a buffer storage means at any moment in time only the amount of electric power that is just being generated at the given time can be transported and/or provided for the consumers or sinks. By virtue of the volatility both of the sources and also the sinks it is thus not possible to ensure supply reliability.

The buffer storage means must be able to compensate in particular for short-notice and short-term fluctuations on the part of the sources and sinks. An example of this is the "kick-down," that is to say, the short-notice implementation of the acceleration control device of an electrically driven motor vehicle. However, grid fluctuations by virtue of short-term weather changes in a supply grid involving a large proportion of renewable energy sources and short-notice load fluctuations constitute a suitable example in terms of the necessity for compensating mechanisms. The buffer storage means must therefore be able to both deliver and also receive power in a dynamic and variable fashion.

In that respect a distinction can be drawn between various kinds of demand situations for the buffer storage means:

1. bridging longer-term periods as far as seasonal storage means,
2. balance-sheet storage for compensating for deficits and surpluses in an electricity grid,
3. compensating for short-notice and time-limited deficits and surpluses as occur for example by virtue of grid fluctuations in an electricity grid in order to stabilize the grid,
4. buffer storage means for a digital end point in a routed supply grid involving packet-based transmission as well as gateways or interfaces of such a routed supply grid involving packet-based transmission to the classic ohmic electricity grid,
5. a demand arising out of new concepts for electricity grids like for example packet-based current transport, and
6. demand scenarios as occur, for example, in the power supply of electrically driven modes of transport like automobiles, ships and aircraft.

In that respect, in principle, two situations which are to be distinguished from each other occur, namely, on the one hand, that the electric power required by a sink or a plurality of sinks at a moment in time exceeds the power afforded by the sources at that time, and on the other hand, that the power provided by the sources at a moment in time is greater than the power required by the sinks at the same time.

SUMMARY OF EMBODIMENTS OF THE INVENTION

Therefore a purpose of the present concept is to provide an electrical power distributor and a method of distributing electric power in an electricity grid, which makes it possible to orchestrate a plurality of sources in such a way that one or a plurality of sinks for electrical energy receives the required power at any time. For that purpose it is necessary, on the one hand, to distribute the power afforded by the sources to the sinks in such a way that the powers required by the sinks are also provided for same and to cover power surpluses or power deficits which occur by taking account of further sources and/or sinks, preferably by taking account of an energy storage means which acts selectively as a source or a sink.

Toward achieving that purpose there is provided an electrical power distributor for an electricity grid comprising an electrical distributor circuit having at least three terminals, wherein sources and sinks for electrical energy can be connected to the terminals, wherein the three terminals are electrically connected together in such a way that an electric current can flow from each of the terminals to each of the other terminals, and wherein each of the terminals has a respective power controller which is so adapted that in operation of the power distributor the electric power $P(t)$ flowing by way of the respective terminal can be adjusted in dependence on time t, a communication device which can be connected to a data network and which is so adapted that in operation of the power distributor it receives data from the sources and sinks, and a control means for controlling a distribution of a flow of the electric power $P(t)$ in dependence on time t at the terminals, wherein the control means is connected to the communication device in such a way that the data received from the communication device can be processed by the control means, wherein the control means is connected to each of the power controllers wherein the control means is so adapted that in operation of the power distributor it calculates the electric power $P(t)$ flowing by way of each of the terminals in dependence on the data received from the sources or sinks, and wherein the control means is so adapted that in operation of the power distributor it controls the electric power $P(t)$ flowing by way of the respective terminal in dependence on time t.

The underlying idea of this electrical power distributor is generating time-dependent power flows (these are also referred to as power profiles) involving different characteristics, that is to say, with different time configurations of the power $P(t)$ at the terminals of the distributor circuit of the power distributor, by the electrical power distributor controlling power flows of the sources connected to it and to sinks connected to it in such a way that the power demanded by the sinks can be provided. In that respect the control mechanisms are based on data which the power distributor or the control means thereof receives from the sources or sinks by way of a communication device which can be connected to a data network.

The term "sources for electrical energy" in accordance with this concept is used to denote all electrical devices which, when they are connected to the power distributor, provide electrical energy or power for same. That can be quite specifically, for example, power stations of all kinds or also rechargeable energy storage means which are discharged. In addition entire subgrids can appear as sources, that are connected to one of the terminals of the distributor circuit.

Correspondingly, the term "sinks for electrical energy" in accordance with this concept is used to denote all types or kinds of electrical consumers, for example, a household connection, but also entire subgrids which draw power from the power distributor. A sink in accordance with the present invention is therefore any unit of an electricity grid, into which electric power flows from the power distributor.

An electricity grid, of which the electrical power distributor forms part in the fitted or installed condition is, for example, an electrical supply grid in which the source and the sink are connected to the power distributor by way of an overhead line or a ground line or an electrical on-board network of a vehicle, an aircraft, a ship, or another mode of transport.

An electrical distributor circuit in accordance with the present invention, in a first simple embodiment, can be a bus bar to which all terminals of the electrical power distributor are connected in parallel relationship. With such a configuration of the distributor circuit the power flows within the power distributor are determined solely by the power controller in the respective terminals.

In a further embodiment at least two of the terminals which can be connected to sources, or when considering an electricity grid are connected to sources, are connected by way of a so-called cross-bar, that is to say, a coupling field, switchably with each other and with a distributor bar, which in turn are connected to the other terminals to which further sources or preferably sinks are or can be connected. A coupling field, earlier also referred to as a cross-bar distributor, serves for switching through the power provided by each source connected to the power distributor to at least one sink connected to the power distributor. Coupling fields for weak currents are known from communication technology and there count among the so-called space multiplex methods. A coupling field denotes a matrix which is connected together (so-called coupling multiples) of incoming and outgoing lines. While a coupling field in communication technology is completely transparent, that is to say, the signals of the inputs are switched to corresponding outputs without changes or falsification, the term "coupling field" in the case of the present application also embraces coupling fields which combine a plurality of power flows together or divide power flows.

An embodiment of the distributor circuit in the form of a coupling field has the advantage over an embodiment in which all terminals are connected in parallel to a bus bar that the sources can be orchestrated independently of the voltages that they provide at the power distributor and in that way any desired voltage level or any desired time configuration in respect of the power can be provided at the terminals which are connected to sinks.

In a further embodiment of the power distributor, all terminals for sources and sinks are connected to a distributor circuit which is an electrical coupling field which selectively permits every connection of the terminals to each other.

Such a configuration has the highest level of complexity in terms of the circuitry, but in return also the greatest possible flexibility in terms of switching states. In particular, with such an embodiment, there is no need to consider whether a source or a sink is connected to a terminal of the power distributor. In particular, it is also possible to connect to each of the terminals in this case an energy storage means which is both discharged and also charged by way of the power distributor.

In an embodiment, all nodes of the coupling field are formed by a closed-loop power controller. In an alternative embodiment all nodes of the coupling field are formed by on/off switches.

In an embodiment of the power distributor, the distributor circuit has a first and a second portion, wherein the first portion includes a coupling field which is so designed that all terminals of the first coupling field which can be connected to a source or a sink can be connected in parallel or in series relationship to the second portion of the distributor circuit. For that purpose the nodes of the coupling field of the first portion of the distributor circuit are formed in an embodiment by closed-loop power controllers. The second portion of the distributor circuit can be in the form of a passive bus bar or also a coupling field which has simple on/off switches at the nodes. The first portion of such a distributor circuit is also referred to as the physical abstraction layer. The advantage of an embodiment of a distributor circuit having a physical abstraction layer is that it has a high degree of flexibility with, at the same time, reduced circuitry complexity.

A central element of the electrical power distributor is a power controller in each of the terminals, wherein the power controller is so adapted that in operation of the power distributor the electric power $P(t)$ flowing by way of the respective terminal is adjustable in dependence on time. In this respect the term "power controller" is used to mean any electronic device with which the electric power $P(t)$ flowing by way of the respective terminal can be adjusted in dependence on time $t$.

In an embodiment of the invention the power controller involves a combination of a boost converter and a buck converter, whose voltage level can be controlled. For that purpose the power controller has a control signal input connected to the control means of the power distributor. In an embodiment the control signal is in the form of the pulse width of a modulated voltage signal, the pulse width controlling the voltage level of the power controller.

In an embodiment the boost converter and the buck converter of the power controller are preferably both of a bidirectional configuration in each of the terminals. In that way a terminal of the power distributor can be connected both to a source and also to a sink. That is significant in particular if the source or the sink involves an energy storage means in the broadest sense, that can be both discharged and also charged by way of the power distributor.

While embodiments of the present invention are possible in which there is only one power controller in the terminals of the distributor circuit, embodiments are preferred in which the power controller is a part of a device referred to herein as a power flow controller (digital flow controller; DFC) in each of the terminals of the distributor circuit. Such a digital flow controller can also be described as a closed-loop power controller, the power level of which is controlled on the basis of a control signal predetermined by the control means of the power distributor.

Therefore, besides the power controller or controllers, such a DFC has a control means which, on the one hand, is connected by way of a data network to the (central) control of the power distributor and, on the other hand, is connected to the power controller or controllers of the DFC so that in operation of the power distributor it provides for open-loop control of the state of the power controller or in an embodiment thereof provides for closed-loop control thereof.

In an embodiment of the invention the control means of the DFC is so adapted that it converts any value for the power flow $P(t)$ of the corresponding terminal, that the control means of the DFC receives from the (central) control means of the power distributor, into a control signal for controlling the power controller or controllers. In an embodiment such a control signal for control of the power controller is the pulse width of the voltage signals with which the gates of the controllable switches, for example thyristors, of the power controller are driven.

In an embodiment of the invention each of the terminals of the power distributor, in addition to the power controller, has a measuring device for detecting an actual electric power flowing by way of the terminal.

In an embodiment that measuring device is part of the DFC and is connected to the control means of the DFC, wherein the control means of the DFC is so adapted that it controls the actual power by way of the terminal of the power distributor in such a way that it is equal to a power P(t) predetermined by the central control means of the power distributor, which in this sense represents the reference power. It is first a measuring device in each of the terminals that permits control of the power current flowing by way of the terminal.

In comparison, in an embodiment of the power distributor according to this concept, each of the terminals additionally has a voltage converter. That voltage converter is desirably part of the DFC. In an embodiment the voltage converter is arranged between the measuring device and the power controller in the DFC.

Such voltage converters are capable of converting an input voltage into a higher or lower output voltage. Voltage converters which convert an input voltage into a higher voltage are also referred to as boost converters. Voltage converters which convert an input voltage into a lower voltage are also referred to as buck converters. Boost converters and buck converters are typically present in the form of dc elements so that when using boost converters and buck converters in an ac system rectification or inversion preferably takes place before and after such a voltage converter.

The power distributor offers certain functions which are essential to the invention even when it receives data either from the sources or the sinks in order to calculate therefrom the power P(t) flowing by way of each of the terminals, at a time t. The power flows P(t) for the future moments in time t for those sources and/or sinks for which there are no data have to be estimated in that case.

Nonetheless, a preferred embodiment is one in which at least data are received from the sources and preferably also the sinks.

A power flow adjusting control in an electrical power distributor in an embodiment presupposes that the power distributor at any time t has information as to which sources can provide at that time t what maximum power $P_{max}(t)$. That presupposes a flow of information from the sources toward the control means of the power distributor. Therefore the electrical power distributor has a communication device which can be connected to a data network and which is so adapted that in operation of the power distributor it receives data from the sources.

In an embodiment such a communication device is an interface for connection to a data network, in which respect it is immaterial to the present concept, by way of what physical transmission path the data network transmits the data to the communication device of the power distributor. The data network can be, for example, a cabled data network or also a radio network.

The power distributor is intended for it to receive data from the sources by way of the communication device. That presupposes that the sources enjoy suitable technology to generate data and transmit same to the communication device of the power distributor. In addition however in an embodiment sources can also be additionally connected to the power distributor, which sources do not provide a data connection to the power distributor. For that purpose, in an embodiment of the invention the control means of the power distributor is so adapted that, for a source which is connected to the power distributor which does not pass any state information in the form of data to the power distributor, it implements an estimate of the power $P_{max}(t)$ to be provided at a maximum by that source at a future time t in order also to be able to integrate that source into the electricity grid. Such an estimate can be based, for example, on an item of information about the type of the source and/or on a measurement of the power provided by that source over a preceding period of time.

In a further embodiment of the invention the power distributor at any moment in time t has information as to which sinks connected to the power distributor take what power at precisely that time t. That presupposes an additional flow of information from the sinks toward the control means of the power distributor. Therefore the electrical power distributor in such an embodiment has a communication device which can be connected to the data network and which is so adapted that in operation of the power distributor it additionally receives data from the sinks.

The control means for controlling a distribution of the flow of electric power P(t) within the electrical power distributor from the terminals connected to the sources to the terminals connected to the sinks is, for example, a microprocessor or generally a computer.

In an embodiment of the invention the control means is so designed and adapted that in operation of the power distributor it controls the power controller in such a way that at any time t the electric power P(t) provided at a terminal which is connected to a sink is equal to the power $P_{dem}(t)$ required by the sink at that time.

The control means is so connected to the communication device of the power distributor that it receives and can process the data received from the communication device. To be able to implement distribution of the flow of electric power P(t) within the power distributor the control means is also connected to each of the power controllers in the terminals of the power distributor. In an embodiment of the invention the control means predetermines for each of the power controllers at least a reference value for the power P(t) in dependence on the time t, that is, to flow by way of the respective terminal. While in an embodiment of the invention the control means also provides for closed-loop control of the power at the respective terminal and for that purpose receives from the terminal a measurement value in respect of the actual power, in other embodiments the power controllers themselves have a dedicated closed-loop control circuit which is so adapted that it adapts the actual power to the reference power predetermined by the control means. The combination of a power controller with the associated closed-loop control means comprising control means and measuring device is referred to herein as the DFC.

In an embodiment at any time t the control means has information about the terminals by way of which what power P(t) is fed into the power distributor and the terminals by way of which what power P(t) is delivered at the time t.

For that purpose in an embodiment of the invention the control means is so adapted that in operation of the power distributor for each time t it calculates the electric power P(t) flowing by way of each of the terminals from:

the electric power $P_{max}(t)$ which can be provided at a maximum at the time t by each source, and the electric power $P_{dem}(t)$ required at the time t by each sink, and it controls the power controller in such a way that the calculated electric power P(t) is adjusted at the time t at the respective terminal.

It will be appreciated that in that case the power P(t) fed into the power distributor by the sources at any time t is at a maximum as great as the electric power $P_{max}(t)$ which can be provided at a maximum by that source at that time. Likewise in an embodiment ideally at the time t each of the sinks connected to a terminal of the electrical power distributor is afforded an electric power equal to the electric power $P_{dem}(t)$ required at that time t by the respective sink.

In other words, the control means determines a power profile for each of the terminals of the electrical power distributor, that is to say, a profile in respect of the electric power P(t) flowing by way of the respective terminal for each time t.

In an embodiment of the invention the control means is so designed and adapted that in operation of the power distributor it approximates or digitizes the power P(t) in dependence on the time t at each of the terminals as an integral multiple of a elementary power dP, wherein dP is constant over a period of time dt. Such an approximation can also be interpreted as and referred to as digitization of the power profiles. That digitization of the power profiles with discrete elementary power levels dP makes it possible to efficiently resolve the algorithmic task of distributing the power of terminals connected to sources to terminals connected to sinks using algorithms. Such algorithms are described in detail hereinafter.

As an alternative to approximation or digitization of the power profiles P(t) by an elementary power dP, wherein dP is constant over a time period dt, it is possible for the control means to be so designed and adapted that in operation of the power distributor it approximates the power P(t) in dependence on time t at each of the terminals as the formula:

$$P(t)=\Sigma_{k=0}^{n} 2^k dP \qquad \text{Eq. 1}$$

That approximation is known in data processing as power of 2 representation.

In order to be able to implement power distribution from the sources to the sinks two tasks have to be resolved. On the one hand the amounts of the power flows of all sources must be apportioned in the power distributor to the amounts of the individual power flows from the power distributor into the sinks. That task can be easily resolved in particular for power flows P(t) digitized as described above. On the other hand the physical paths required for distribution within the distributor circuit have to be determined and connected so that all required power flows are fulfilled for the connected sinks.

The power distributor combines therewith, that is to say, adds power flows of various sources so that the desired power flows to the sinks take place. In an embodiment that is achieved in that the voltages are so adjusted at the terminals of the sources that the power flows occur there. Either in the case of parallel circuits the currents are added by voltage leveling or in the case of a series circuit the voltages are added so that the individual load flows add up.

The steps required in an embodiment can be summarized as follows:

1. determining the required power profiles $P_{dem}(t)$ of each sink connected to the power distributor for each future time t, 2. determining the power profiles for maximum provided power $P_{max}(t)$ of each source for each future time t, 3. digitizing the power profiles of sources and sinks, 4. resolving the optimization task as to how the profiles of the sources can be distributed to the sinks, with an orchestration algorithm, 5. connecting the sources and sinks by means of the distributor circuit, 6. adjusting the individual power flows at the terminals of the sources and sinks by the power controller, and 7. governing the process by suitable closed-loop and open-loop control circuits.

The step listed as item 4 above is based on the following task: which sources have to be connected in what time succession by way of what paths in the distributor circuit and DFC so that the power profiles required by the sinks can be provided at the terminals of the power distributor, that are connected to sinks. That can be resolved for more complicated tasks by means of suitable algorithms. Examples of suitable algorithms are the simplex method and genetic algorithms. Algorithms according to embodiments of the present invention, as are described in detail hereinafter, are also suitable.

In an embodiment of the invention the control means is so adapted that in operation of the power distributor it apportions digitized electric powers P(t) flowing by way of each of the terminals connected to a source to the electric powers P(t) flowing by way of terminals connected to a sink. For that purpose the following steps are carried out in an embodiment:

1. calculating for each time slice t and for all sources j the difference:

$$\Delta_{1,j_t}=A_{1_t}-z_{j_t}, \qquad \text{Eq. 2}$$

2. if $\Delta_{1,j_t} \leq 0$, already applies for a single source, then the demand from a single source can be fulfilled, the calculation terminates and the residual value of the source is updated by the taken value $z_{j_t}:=z_{j_t}-A_{1_t}$, and preferably further correction term time slices dependent on the type of source, 3. if a single source j does not fulfil the demand, checking whether there are two sources j and i so that with $\Delta_{1,j_t}=A_{1_t}-(z_{j_t}+z_{i_t})$, $\Delta_{1,j_t} \leq 0$ applies, and if that condition is fulfilled updating of the residual values of both sources so that $z_{j_t}:=z_{j_t}-A_{1_t}$, respectively applies for both sources, 4. if the demand cannot be fulfilled even with two sources repeat step 2 with three and more sources, wherein $A_k$ is the value of the k-th demand profile and $z_{j_t}$ is the value of the maximum provided power of the j-th source during the t-th time slice.

The paths through the distributor circuit from the sources to the sinks are also determined with known algorithms or are read out of corresponding link tables.

In an embodiment of the invention the control means is so designed and adapted that in operation of the power distributor it controls the current flow on the assumption of elementary energy packets with an energy dP×dt.

In an embodiment of the electrical power distributor one of the terminals of the power distributor is electrically connected to an electrical energy storage means which is so adapted that in operation it can receive, store and/or deliver electrical energy, wherein the energy storage means is so adapted that based on information about a current state of the energy storage means the maximum electric power $P_{max}(t)$ which can be provided by the energy storage means at a future time t and a power input $P_{cap}(t)$ at a maximum at a time t can be calculated, and wherein the control means is so designed and adapted that in operation of the power distributor in the calculation of the electric power P(t) flowing by way of each of the terminals at a time t the maximum electric power $P_{max}(t)$ which can be provided by the energy storage means at that time t or the power input $P_{cap}(t)$ possible at that time t of the energy storage means is taken into account. Such an embodiment has the advantage that "mismatches" between the electric power flowing into the power distributor at a time t and the electric power flowing out of the power distributor at that time can be compensated by such an energy storage means. For that purpose either the energy storage means is charged with surplus electrical energy or missing electrical energy is afforded by the energy storage means and therewith the terminals connected to the sinks. A prerequisite for the power distributor being able to operate is that the energy storage means is so adapted that it is possible to calculate from an item of state information about the state of the energy storage means, at any time $t_1$, at any moment in time $t=t_1+\Delta t$ in the future, both the maximum power input $P_{cap}(t)$ of the energy storage means and also its electrical power $P_{max}(t)$ which can be provided at a maximum at that time t. This is on the assumption that all power flows are recorded as from the time $t_1$ and are available for calculating the powers $P_{max}(t)$ and $P_{cap}(t)$.

In an embodiment of the invention such an energy storage means is, for example, a supercapacitor, a chemical energy storage means, a mechanical/kinematic energy storage means, a potential energy storage means, or a thermodynamic energy storage means.

While in an embodiment at least one such electrical energy storage means electrically connected to one of the terminals of the power distributor forms an integrated system with the electrical power distributor, the demand on the electrical energy storage means in relation to its maximum electric power $P_{max}(t)$ which can be provided at any time t is also to be made on all other sources for electrical energy, that are electrically connected to one of the terminals of the power distributor.

Therefore at least one of the above-mentioned objects is also attained by an electrical electricity grid comprising an electrical power distributor as was described hereinbefore in embodiments of the invention, and a data network connected to a communication device of the power distributor, at least one source for electrical energy, wherein the source is electrically connected to one of the terminals of the power distributor, wherein the source is so adapted that based on information about a current state of the source the electric power $P_{max}(t)$ which can be produced at a maximum by the source at a future time t can be calculated, and wherein the source has a communication device which is connected to the data network and which is so adapted that in operation of the data network, it transmits data with information about a current state of the source and/or with information about the electric power $P_{max}(t)$ which can be provided at a maximum at a future time t to the communication device of the power distributor, and at least one sink for electrical energy, wherein the sink is electrically connected to one of the terminals of the power distributor, and wherein the sink has a communication device which is connected to the data network and which is so adapted that in operation of the electricity grid it transmits data with information about an electric power $P_{dem}(t)$ required by the sink at a future time t to the communication device of the power distributor.

A substantial property of the energy storage means is that the electric power $P_{max}(t)$ which can be provided at a maximum thereby at any future time t or the power $P_{cap}(t)$ which can be received at a maximum by the energy storage means at any future time can be calculated if information about the current state of the energy storage means is available at the time of calculation. Such information includes in particular the charge state of the energy storage means and its charging or discharging performance in relation to time. In that respect certain properties are already defined by the type of energy storage means. Thus for example a supercapacitor has a different discharging curve from a conventional lithium ion battery. Further information about the state is, for example, the temperature of the energy storage means. Particularly in the case of rechargeable batteries the discharging characteristic is dependent, for example, on the temperature at which the battery will operate and on the number of charging cycles which the battery has already experienced.

It is possible for an energy storage means whose maximum electric power which can be provided at a future time t and whose maximum power input at a future time t can be calculated on the basis of information about a current or present state of the energy storage means to be denoted as a deterministic energy storage means.

In that respect, in terms of the functionality of the power distributor, it is immaterial whether the energy storage means transmits information about its current state by way of the data network and the communication device to the control means of the power distributor and same carries out the calculation of $P_{max}(t)$ and $P_{cap}(t)$, or whether $P_{max}(t)$ and $P_{cap}(t)$ are calculated on the part of the energy storage means itself, that is to say, in a computing device present there, and then $P_{max}(t)$ and $P_{cap}(t)$ are transmitted to the control means of the power distributor by way of the data network and the communication device. Embodiments are also possible in which the energy storage means only has measuring devices which are read out by the control means of the power distributor to determine $P_{max}(t)$ and $P_{cap}(t)$. In an embodiment of the invention $P_{max}(t)$ and $P_{cap}(t)$ are determined on the basis of information about the storage means type and the structure of the energy storage means on the basis of measurements of current and voltage in a measuring device of a DFC in the terminal of the power distributor, to which the energy storage means is connected. In such an embodiment the energy storage means itself does not need any communication interface or measuring devices.

In a similar way as was described in detail hereinbefore in an embodiment of the electrical energy distributor with an electrical energy storage means, it is a prerequisite for the electricity grid according to the invention that the sources for electrical energy, that are connected to the power distributor both by way of the electricity grid and also by way of a data network, are deterministic sources which make it possible, based on information about a current state of the energy source, to calculate the electric power $P_{max}(t)$ which can be provided at a maximum by the energy source at a future time t. Those sources for electrical energy can also be referred to as deterministic sources. As before it is immaterial in that respect whether the source communicates as information by way of the data network to the control means of the power distributor the electric power $P_{max}(t)$ which can be provided at a maximum at any time t in the future, or items of state information which make it possible for the control means to calculate $P_{max}(t)$. It is easy to calculate the maximum power $P_{max}(t)$ which can be provided, for example for diesel generators, with a power delivery which is constant over time.

In addition, in an embodiment, from the view of the power distributor, the sinks connected to the terminals of the power distributor must also be deterministic in the sense that the control means of the power distributor is aware at any time t, what power $P_{dem}(t)$ is required at that time t by the respective sink. For that purpose in an embodiment the sink transmits that information by way of the data network and the communication device of the power distributor so that it is available to the control means of the power distributor. As an alternative in an embodiment the required power of a sink can also be estimated by the control means of the power distributor or calculated in some other way.

In a further embodiment of the invention the source or sources and the sink or sinks are connected to the power distributor by way of an overhead line or a ground line or an underwater line. In other words in such a case the electricity grid is a distributor grid for connecting households, industrial enterprises, or other consumers to energy generators like for example conventional power stations, power stations for producing renewable energy, or energy storage means.

In an alternative embodiment of the invention the electricity grid is an on-board system of a vehicle, an aircraft, or a ship.

In an embodiment of the invention the energy storage means and the source for electrical energy that are connected to terminals of the power distributor have mutually different power profiles P(t). That makes it possible with the combination of the energy storage means and the source for electrical energy to fulfill entirely different power profiles on the part of the sink or sinks.

At least one of the above-mentioned objects is also achieved by a method of distributing electric power in an electricity grid comprising the steps: connecting at least three sources and sinks for electrical energy to a respective terminal of the distributor circuit, wherein the terminals of the distributor circuit are electrically connected together in such a way that an electric current can flow from each of the terminals to each of the other terminals, and receiving data from the sources or sinks; calculating the electric power P(t) flowing by way of each of the terminals in dependence on time t and in dependence on the data received from the sources or sinks; and controlling the electric power P(t) flowing by way of the terminals at a time t by means of a respective power controller connected to the terminal.

Insofar as embodiments of the invention have been described hereinbefore in regard to the electrical power distributor and the electricity grid with that power distributor these also apply to the corresponding method of distributing electric power in an electricity grid. Insofar as the method is carried out with the power distributor or the electricity grid according to the invention the method has the appropriate steps for same. In particular however embodiments of the electrical power distributor and the electrical power grid are also suitable for carrying out embodiments of the method.

The power distributor according to embodiments of the related invention and the related methods of distributing electric power in an electricity grid can be advantageously used in a series of applications. In electricity grids, for example, a supply grid or an on-board network system of a motor vehicle, the power distributor in an embodiment can serve for grid network stabilization, in particular for buffering off short-notice fluctuations in the power delivery or in the power demand. In another embodiment the power distributor can serve as an interface between conventional network grids and digitally controlled network grids, so-called smart grids, or packet-based power transmission grids. In a further embodiment of the invention the power distributor is used for management of energy storage means, preferably batteries. In that respect it controls in particular recharging processes and charge management of the energy storage means.

BRIEF DESCRIPTION OF THE DRAWING

Further advantages, features, and possible uses of embodiments of the present invention will be clearly apparent from the description hereinafter of embodiments thereof and the accompanying drawing, in which:

FIG. 16 diagrammatically shows the power flow by way of example in the on-board network of FIG. 15 in an excellent load situation.

In the drawing identical elements are denoted by identical reference numerals.

DETAILED DESCRIPTION OF EMBODIMENTS OF THE INVENTION

Figure 1:
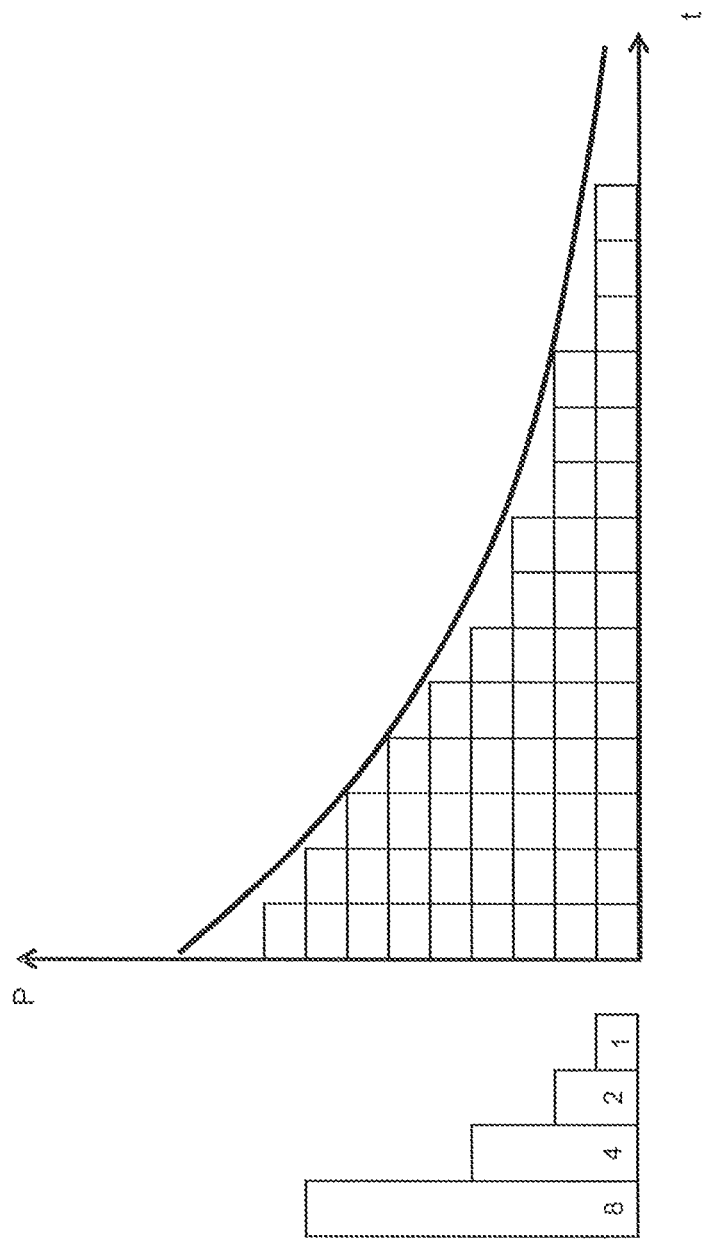
FIG. 1 diagrammatically shows an embodiment of digitization of a power profile according to an aspect of the invention of a capacitor during discharge.

In the description hereinafter of specific embodiments, firstly the power characteristic of energy storage means and a concept for approximation of the power profiles, that is to say, the configuration of the electric power delivered by the energy storage means in dependence on time, is discussed. There follows a portion about the structure and the mode of operation of an embodiment of the power control according to the present concept and the connection of energy storage means to that power control. The discussion finishes with the description of a number of examples of electricity grids in which a power distributor of that kind is used.

For the storage of electrical energy there are a large number of methods, for example, electrochemical storage means, potential energy storage means, or capacitive storage means. All those storage means have different power characteristics, that is to say, the electric power $P_{max}(t)$ provided at a maximum by the storage means in dependence on time or the electric power $P_{cap}(t)$ which can be received at the time t, are different from each other. That is not only between different storage principles but also between the various specific technologies within a storage principle.

The differing power characteristics of the different types, technologies, and forms of electrical energy storage means, if they are combined together, can be used to meet within an electricity grid quite different demands which are set by the sinks of the electricity grid.

In the field of electromobility, for example, when considering an electrically driven motor vehicle, fluctuating demands are made on the power supply of the different consumers or sinks depending on the respective travel situations and environmental conditions. Examples of such consumers are a heating system, headlights, electroviscous shock absorbers, and wheel hub motors. In that respect each consumer involves different characteristics, that is to say, a differing power draw in dependence on time. That results in a complex dynamic in respect of the demands on the electric power to be provided.

The provision of electrical energy within an electricity grids for supplying households, industry, and other consumers also involves high dynamics in particular when the grid has a large number of weather-dependent sources, for example, wind turbines or photovoltaic installations.

To guarantee stable operation in an electricity grid it is necessary for the sources to produce precisely as much current as the sinks consume.

In the linguistic usage adopted in the present application all those elements in an electricity grid which deliver electric power are referred to as sources. All those elements which consume the electric power are considered as sinks. In this sense an energy storage means is both a source and also a sink for electrical energy. A subgrid of an electricity grid which has both sources and sinks, can appear both as a source and also as a sink from the point of view of a network node, that is to say, a power distributor according to the invention embodiments which links that subgrid to other subgrids, depending on whether the power distributor which is being considered receives electric power from the subgrid or delivers electric power thereto.

For the situation where there are no data in respect of the sources and sinks the attempt is made in accordance with an embodiment of the invention to predict both the power consumption of the sinks and also the power delivery of the sources for any moment in time t by means of model-based methods, artificial intelligence-based methods, or classic schedules.

Short-term and slight fluctuations in the power delivery of the sources and the power consumption of the sinks is buffered in conventional grids by the rotational energy of the generators. That bridging-over action by way of the support of the rotational frequency of the generators is implemented until the control mechanisms of the grid have adapted generation. In grids which manage without conventional rotating electromechanical generators or have only a small number thereof such buffering must be managed by a power distributor according to the present concept. In that case situations typically arise in which a difference in respect of electric power between the demand on the part of the sinks and the provision of the sources has to be taken up in the short term by a storage buffer, more specifically, until the power flow from the sources connected to the power distributor is in total again as great as the power flow into the sinks connected to the power distributor.

In an embodiment of the invention therefore, deficits or surpluses occurring in the electric power in the electrical power distributor have to be compensated by suitable energy storage means or sources which can be additionally brought into operation. In particular, for compensating for grid fluctuations the methods described hereinafter for controlling the power distributor are used to generate power profiles which in the short term make available the necessary power flows from energy storage means connected to the power distributor, for supporting the grid. In that case those power profiles for supporting the grid are so selected that the predetermined power flow or the voltage level or the grid frequency lie within the predetermined tolerances.

In order to be able to meet the demands on power distribution, in an electricity grid according to an embodiment of the present invention, the power profiles both of the sources and also of the sinks are approximated by elementary power profiles with power units dP which are constant over a period of time dt. In that case approximation of the actual power profile P(t) by dP can be understood as digitization of the power profile P(t). That approximation simplifies the algorithms for distribution of the electric power between the powers provided by the sources at a time t and the powers required by the sinks at that time.

In that respect two different approximation methods present themselves for approximation of the power profiles.

On the one hand the power P can be approximated in a given time interval dt as P#, wherein the following applies:

$$P\# = n_i * dP, \quad \text{Eq. 3}$$

where $P - P\# \leq \delta$. In other words, the power P in the period dt is approximated as an integral multiple of the elementary power profile dP.

FIG. 1 shows an approximation carried out in that way in respect of the power profile P(t) of a discharging capacitor. Such a capacitor could be used, for example, as an energy storage means connected to a terminal of the power distributor. The following generally applies for the power delivery of such a capacitor:

$$P(t) = P_0 * \exp\left(-\frac{2t}{RC}\right), \quad \text{Eq. 4}$$

wherein R is the load resistance and C is the capacitance of the capacitor. $P_0$ is the power delivered in the completely charged state at the time $t_0$.

Figure 2:
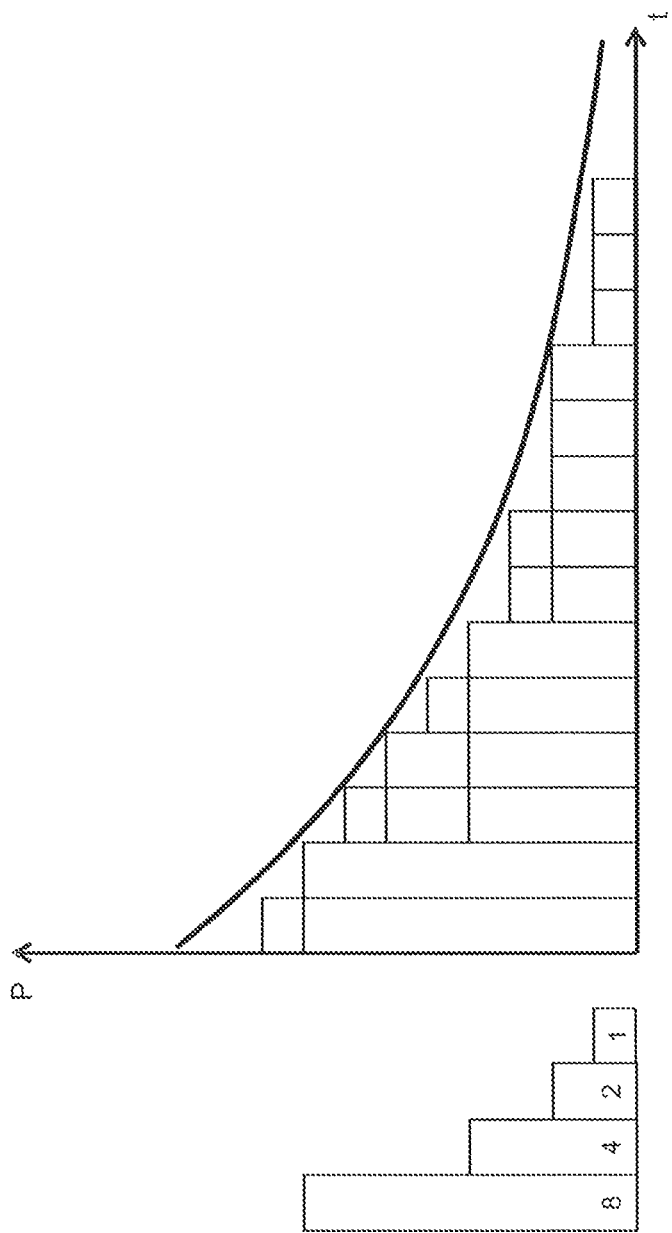
FIG. 2 diagrammatically shows a further embodiment of digitization of a power profile of a capacitor during discharge.

Alternatively the approximation can be implemented by means of a power of 2 formation law as is known from digital technology. A configuration of the power curve P(t), approximated in that way, in respect of the discharging capacitor, is shown by way of example in FIG. 2. The digitized approximation P# can then be described as:

$$P\# = \Sigma dp_k = \Sigma 2^k * dp, \quad \text{Eq. 5}$$

wherein $dp_k = 2^k * dp$.

It is appropriate for capacitors whose power profile may be approximated by a power of 2 formation law to be implemented by capacitor banks.

To be able to meet the power demands $P_{dem}(t)$ at any time t of the individual sinks connected to the terminals of the power distributor the power flows of the various sources (this includes energy storage means, like the above-considered capacitor) must be combined together m such a way, that is to say, connected in the power distributor, that the demanded power flows of each individual sink connected to the power distributor can be implemented.

For that purpose in the illustrated embodiment it is necessary to provide at least one energy storage means which is capable in the case of a deficit of supplementing the power provided by the other sources connected to the power distributor or in the case of a surplus receiving the power not required at a time t.

To be able to achieve the distribution task the current state of all sources, including a source identified as an energy storage means and at least the power demand $P_{dem}(t)$ of the sinks, must be known at any time t. At that time slice dt which belongs to a time t and over which the elementary power unit dP used for approximation of the power flows P(t) is constant it is established in a state model how the maximum power $P_{max}(t)$ provided at that time t in respect of the sources and the demanded power $P_{dem}(t)$ of the sinks appears and how the power of the sources can be distributed to the sinks. As stated hereinbefore, that is effected by approximation of the power curves of the sources and sinks.

As an alternative to consideration of the powers, the control of the power flow in an embodiment could also be effected on the basis of the voltage U(t) as the following applies:

$$P(t) = \frac{U^2(t)}{R}, \quad \text{Eq. 6}$$

wherein R is the resistance of the source or the sink respectively.

Figure 3:
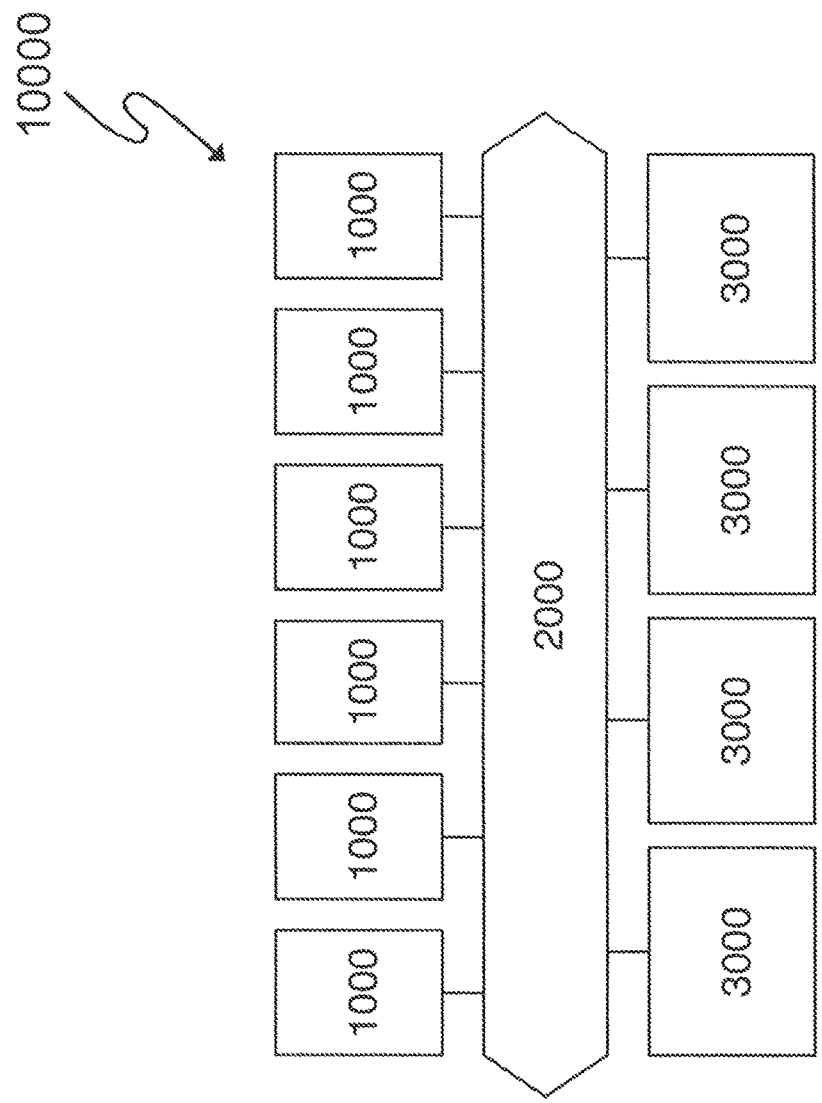
FIG. 3 diagrammatically shows the structure of an electricity grid according to an embodiment of the invention.

FIG. 3 diagrammatically shows an electricity grid 10000 comprising a plurality of sinks or consumers 1000, a plurality of sources or generators 3000, and power distributor 2000 according this embodiment.

All terminals of the power distributor are of a bidirectional nature so that for the power distributor 2000 in the described embodiment, it makes no difference whether a source or a sink is connected to one of its terminals. Typically individual elements connected to the power distributor 2000 can be both a source and also a sink. An example in that respect is an energy storage means. That, however, also applies when one of the elements connected to the power distributor, for example, one of the sinks 1000 is a subgrid of an electricity grid, that is connected to other subgrids by way of power distributor 2000. Consideration of whether an element 1000, 3000 connected to power distributor 2000 is a source or a sink only depends on whether that element is making electrical power available to the power distributor or is receiving electrical power therefrom at a given time t. To simplify consideration of the situation, it is always assumed in the description hereinafter that, at a given time t, all elements identified by 1000 are sinks and all elements identified by 3000 are sources. Together the elements 1000, 3000 are also referred to as nodes.

Figure 4:
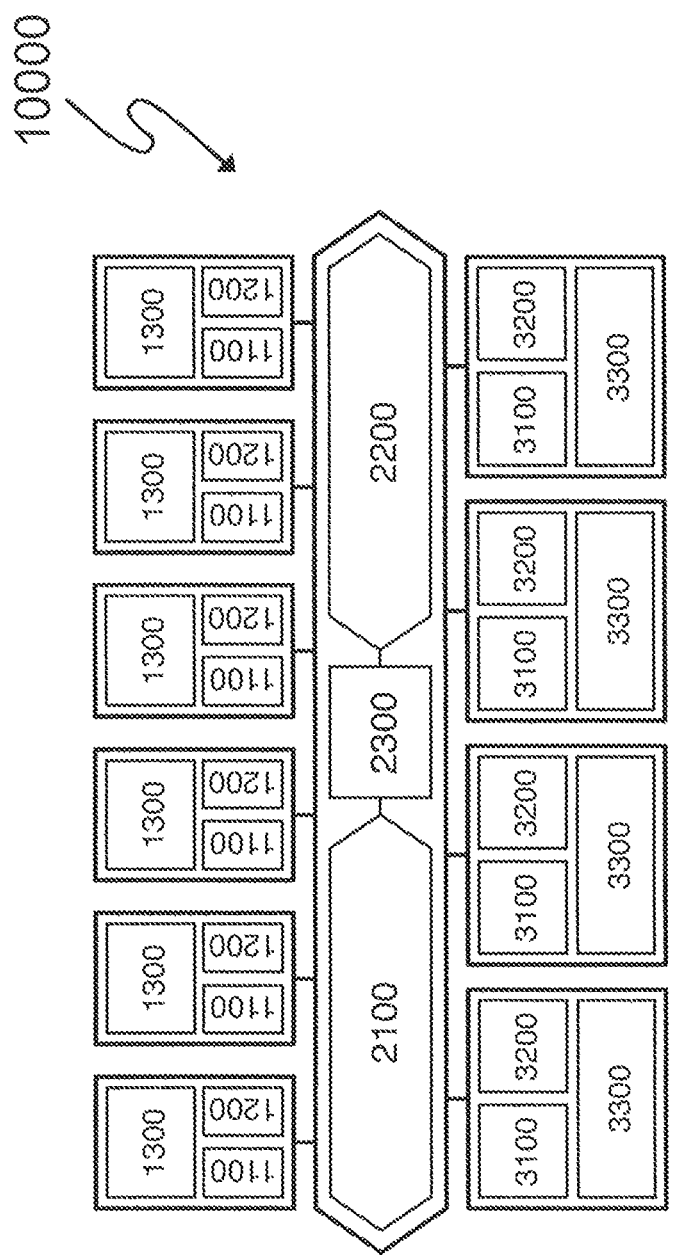
FIG. 4 diagrammatically shows a detailed representation of the electricity grid of FIG. 3.

FIG. 4 shows a detailed representation of the electricity grid in FIG. 3, in which respect it can be seen in this representation that the electricity grid includes, logically and also physically, two networks. These are on the one hand a data network which permits information exchange between individual communication devices of the components of the electricity grid. The data network connects each of the sink controllers 1200 of sinks 1000 to a communication device 2200 of power distributor 2000, and the source controllers 3200 of the sources 3000 for electrical energy to the communication device 2200) of the power distributor. In comparison the electrical terminals 1100 and 3100 respectively of sinks 1000 and sources 3000 are electrically connected to a connecting system 2100, wherein that connecting system 2100 forms an electrical distributor circuit in accordance with the present concept.

The electrical terminals 1100, 3100, and thus the actual consumers 1300 and generators 3300, are connected together by way of the distributor circuit 2100. The components 1100, 2100 and 3100 thus form the power part of the illustrated electricity grid. In the linguistic usage adopted herein, the term "generator 3300" embraces any kind of electrical energy source, for example, in the form of a turbine, a wind power installation, a photovoltaic installation, or a battery.

A control means 2300 of the power distributor 2000 serves to control the flows required at a time t of the electric power in the power part 1100, 2100, 3100 and to calculate the power flows required at that time from items of state information which are exchanged in the data network between the communication devices 1200, 2200, 3200 connected thereto.

The object of the controllers 1100 of sinks 1000 is to generate digitized demand profiles for the required power $P_{dem}(t)$ in dependence on time t on the basis of the current power demand and the power demand to be expected on the part of the actual consumers 1300 and to communicate same to the communication device 2200 of the power distributor by way of the data network.

The object of the controllers 3200 of sources 3000 in contrast is to determine and to update state information about generators 3300 and from that state information to calculate the electric power which can be provided at a maximum by the source 3000 at any future time t and to pass that information to the communication device 2200 of power control 2000.

In embodiments which are not described in detail here it would alternatively be possible for the controller 3200 to determine and update only state information in respect of generator 3300 and to pass that state information to the communication device 2200 of power distributor 2000 by way of the data network, in which case then the central control 2300 takes over calculation of the electric power $P_{max}(t)$ which can be provided at a maximum by source 3000 at a time t.

Now hereinafter the structure of the distributor circuit 2100 which forms the central element, controlled by the control means 2300 of power distributor 2000, is described in detail.

A necessary prerequisite for power flow control in the electrical power distributor is that each of the terminals has a power controller which makes it possible to adjust the electrical power P(t) flowing by way of the respective terminal in dependence on time t. An embodiment of such a power controller is described hereinafter. The power controller is part of a digital flow controller DFC which, in addition to the power controller, has further components. The digital flow controller with the power controller, beyond its use in each of the terminals of the distributor circuit, can also be used as a variable switch in the electrical power circuit itself, as is also described hereinafter.

Figure 5:
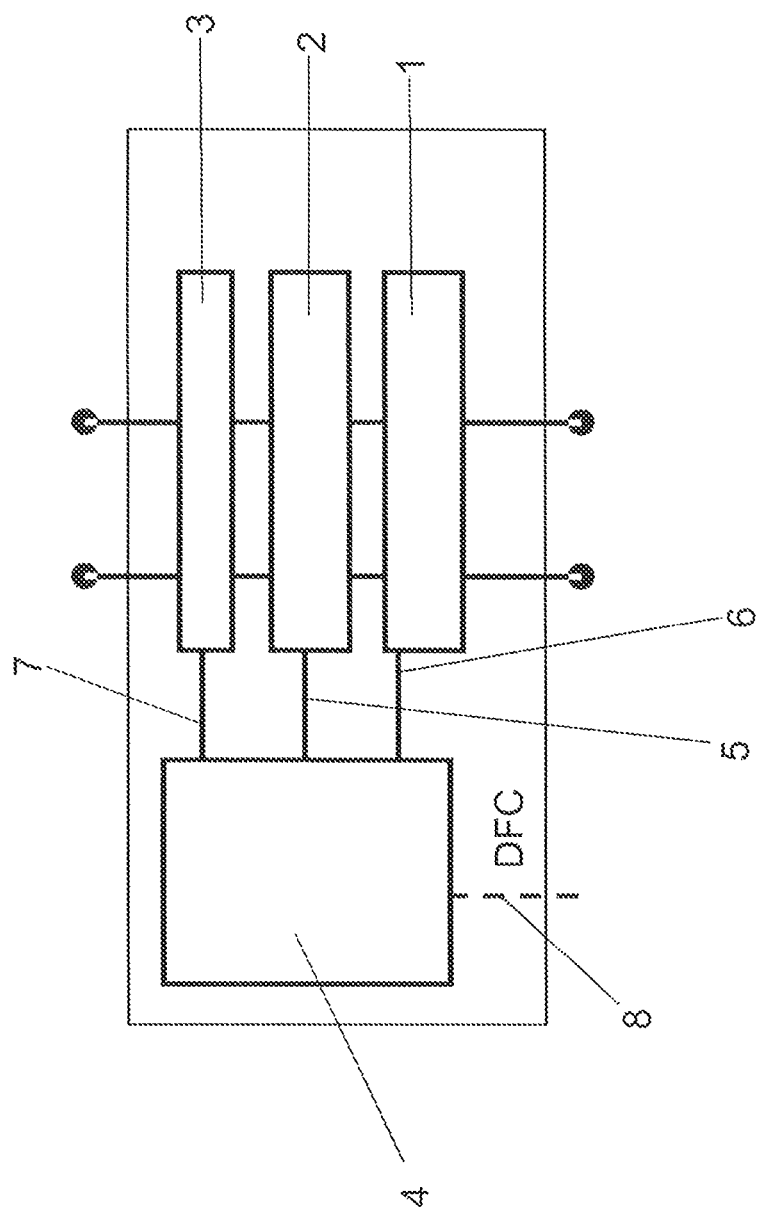
FIG. 5 is a block circuit diagram of the digital flow controller according to an embodiment of the invention.

FIG. 5 is a block circuit diagram of the digital flow controller DFC with its individual components. The digital flow controller has a computer unit 4 (as a control means of the DFC in accordance with the present application), for open-loop control, closed-loop control, management, and communication. The digital flow controller also has a connection to a data network, here IP network 8, a power converter 1 based on a bidirectional boost/buck converter, a DC/DC converter 2, and a measuring device 3 for detecting the actual electrical power from a measurement of current and voltage. The computer unit 4 is connected by way of control lines 5, 6 to boost/buck converter 1 and DC/DC converter 2, and to the measuring device 3 by way of a measuring line 7.

The DC/DC converter serves to adjust the voltage level required by the network. The digital flow controller in FIG. 5 is a dc voltage (DC) component. Even if the actual DFC presupposes a DC mode of operation it is nonetheless also possible to implement power distribution in an AC power grid with that digital flow controller. For that purpose it is necessary to provide between power converter 1 of the DFC and the respective AC source or AC sink a bidirectional AC/DC converter which converts the ac voltage coming from a source into dc voltage for distribution in the power distributor or which converts DC voltage coming from the power distributor into AC voltage in order then to provide the power for a sink.

Figure 6:
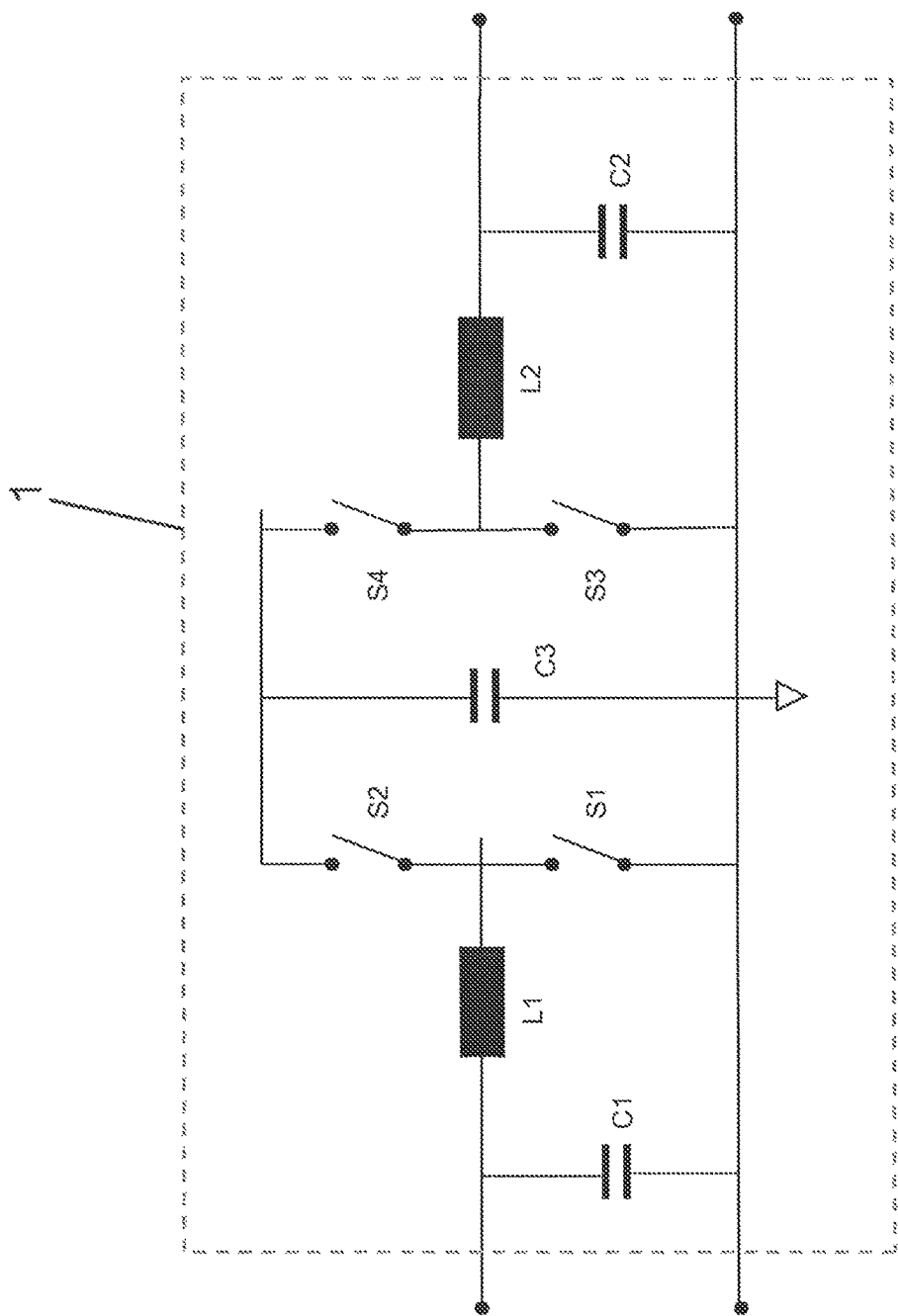
FIG. 6 shows a schematic circuit diagram of a bidirectional boost/buck converter according to an embodiment of the present invention.

FIG. 6 is a schematic circuit diagram of the bidirectional boost/buck converter 2 of FIG. 5. That is capable of controlling a power flow in both directions, that is to say, both into the power distributor and also out of the power distributor, toward sinks or consumers respectively.

The electrical distributor circuit 2100 of the electrical power distributor 2000 can be implemented in a series of embodiments.

Figure 7:
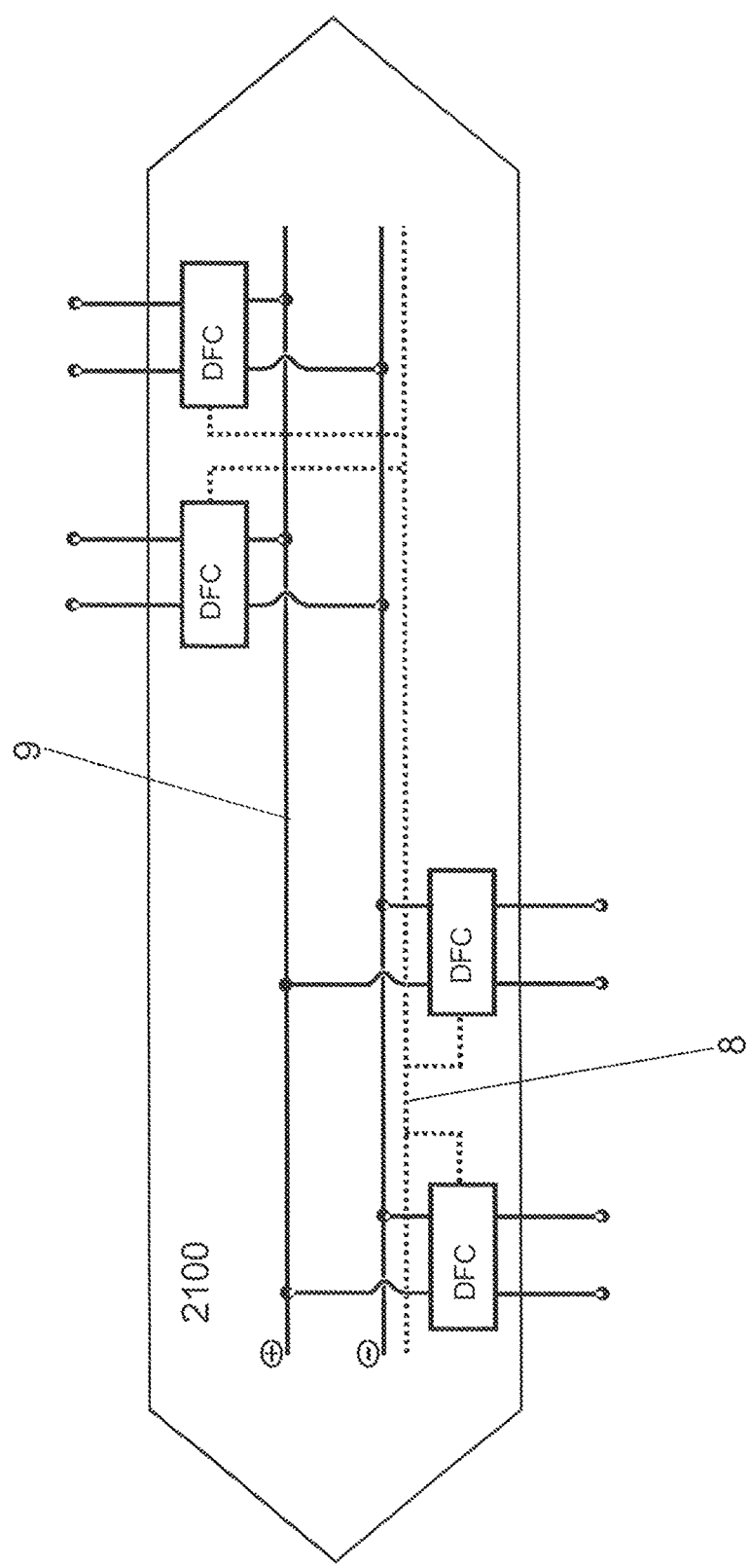
FIG. 7 is a schematic circuit diagram of a distributor circuit with a passive bus bar for the power distributor according to an embodiment of the invention.

FIG. 7 shows a first very simple embodiment of the distributor circuit 2100, wherein the respective digital flow controllers DFC are implemented in the terminals of the distributor circuit. The distributor circuit in FIG. 7 includes a simple bus bar 9 to which all terminals and thus the digital flow controllers are connected in parallel.

FIG. 7 also indicates that the individual DFCs are connected together by way of data network 8. The data network in turn connects the digital flow controllers to control means 2300 of power distributor 2000.

That configuration of the distributor circuit has the advantage that it is easy to implement and the power distributor manages overall with a number of digital flow controllers, that is equal to the number of terminals of the distributor circuit. The disadvantage of this simple embodiment of the distributor circuit is that it suffers from limitations in regard to configurability of the power distribution from the sources to the sinks.

When the sources are connected to the passive bus bar 9 in FIG. 7 all terminals are connected in parallel to the bus bar. In other words all sources are operated at the bus bar with dc voltage, and the currents are added. The DFCs provide that the corresponding power is supplied. So that all sources can be connected to the same voltage level a DC/DC voltage converter 2 is provided in each power controller.

Figure 8:
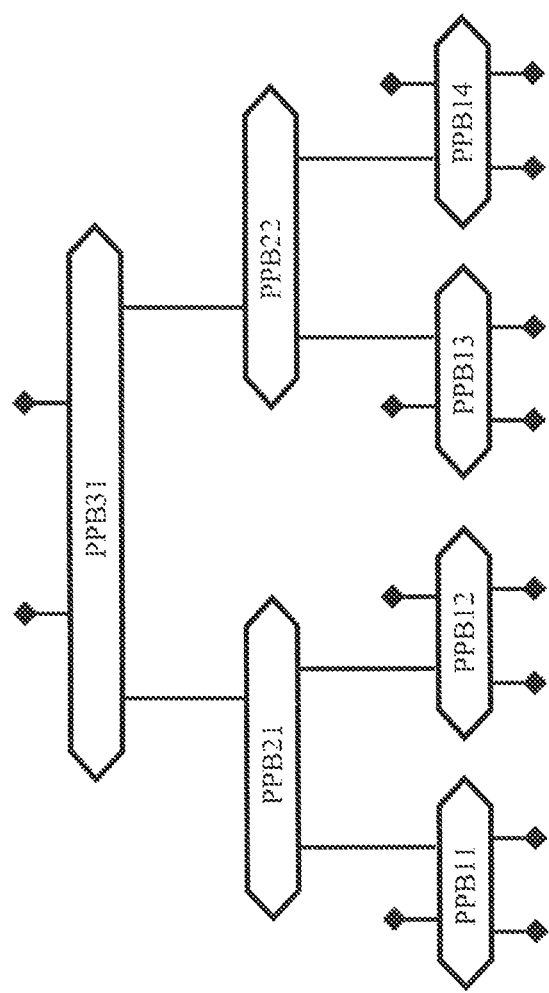
FIG. 8 shows a diagrammatic representation of a cascaded arrangement of passive bus bars as shown in FIG. 7.

A serial connection of the sources is not possible with the passive bus bar 9. For that purpose a cascade of passive bus bars is required, which form a tree. Such an arrangement is diagrammatically shown in FIG. 8. In that circuit respective individual terminals of a bus bar can be connected to a terminal of a distributor bar in a next-higher bus bar.

Then, only one respective terminal of a bus bar can be serially connected by way of a terminal of the next higher bus bar. If there is a wish to connect a terminal Z at the passive bus bar PPB11 in FIG. 8 to a terminal Z2 at the bus bar PPB12, it is thus necessary to switch off all other terminals except Z1 and Z2 on PPB11, PPB12. Z1 and Z2 can then be connected in series by way of PPB21. That means however that all other terminals at PPB11 must be switched off.

That cascading permits a simple circuitry structure but, besides the reduced flexibility, also leads to shut-off of many terminals.

Figure 9:
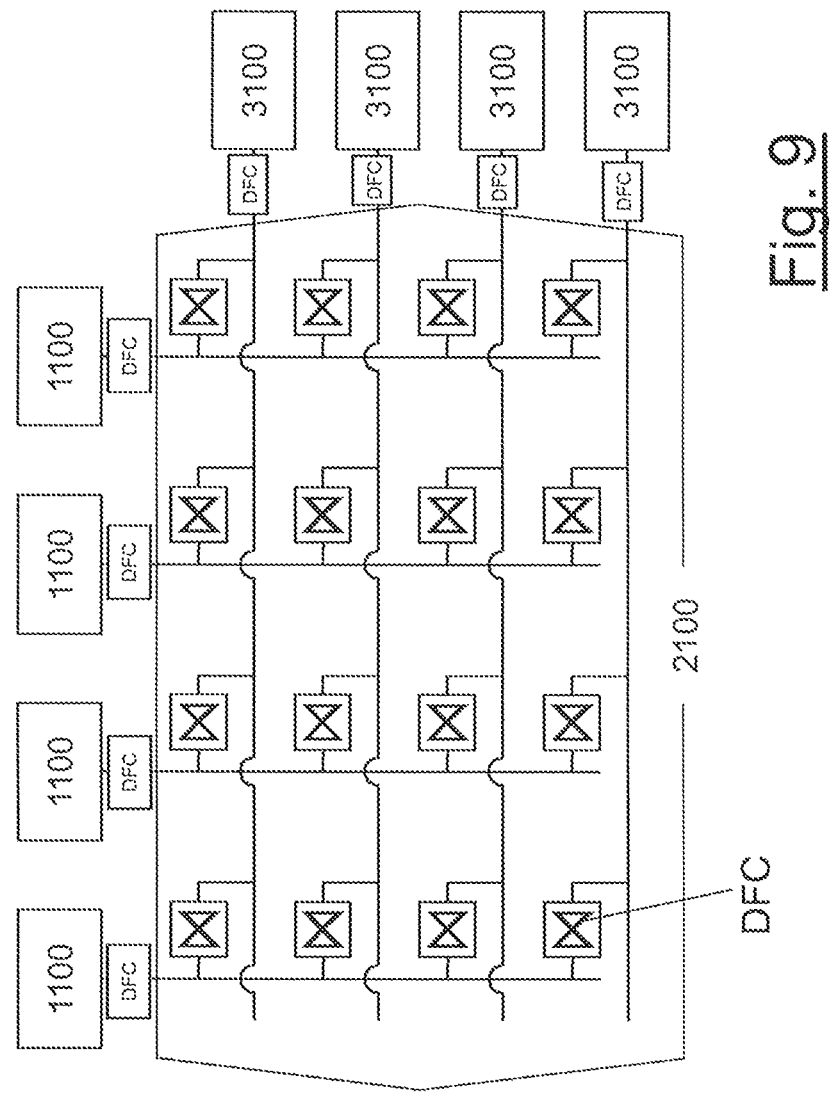
FIG. 9 is a diagrammatic representation of a completely reconfiguratable coupling field as a distributor circuit according to an embodiment of the present invention.

In comparison FIG. 9 diagrammatically shows the structure of the power distributor 2100 in the manner of a completely reconfiguratable crossbar, that is to say, a six by four coupling field. This makes it possible for each of the sources 3000 (only the power part 3100 is shown in FIG. 9) to be connected to each of the consumers 1000 (only the power part 1100 is shown in FIG. 9). In addition all sources 1000 can be connected together selectively in parallel or in series. For that purpose the distributor circuit 2100 in FIG. 9 has a digital flow controller DFC at each node of the coupling field.

Figure 10:
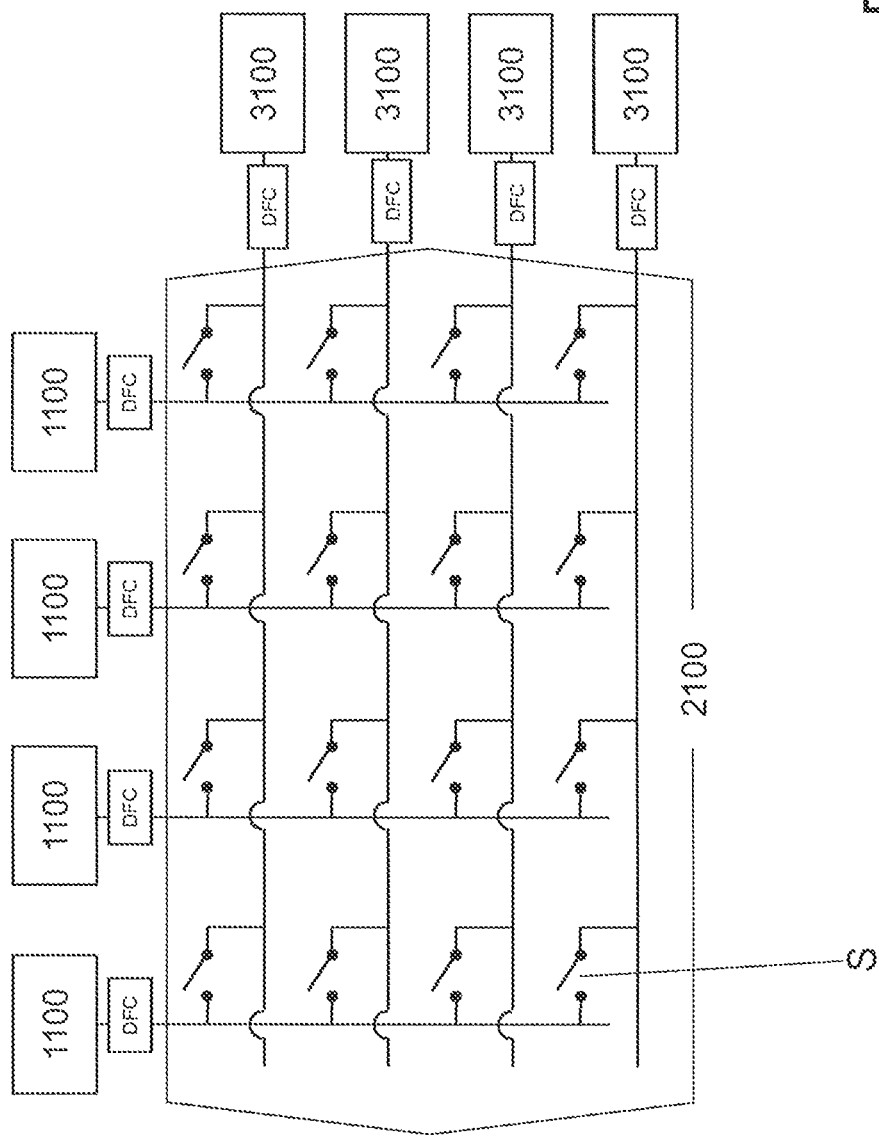
FIG. 10 shows a diagrammatic representation of a variant of the coupling field of FIG. 9.

FIG. 10 shows a variant of the coupling field in FIG. 9, wherein the switches S at the nodes of the coupling field are in the form of simple on/off switches. In addition however, DFCs are provided in the terminals of the sources 3000 and the consumers 1000 in order to provide the required power flow control.

Figure 11A:
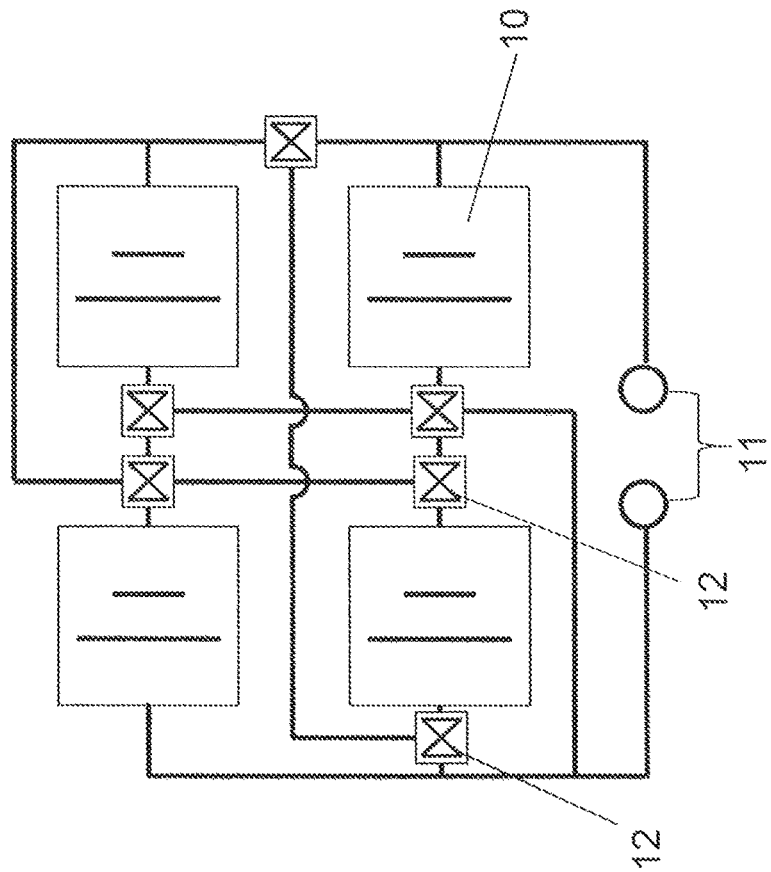
FIG. 11a) is a representation by way of example of a 4×1 coupling field.

FIG. 11a) shows by way of example a simplified crossbar having four sources 10 and only a single terminal 11 for a sink, in which respect account is taken of the fact that each of the DC sources 10 must be connected by way of two lines to the terminal 11 for the sink. Reference 12 in FIG. 11a) respectively denotes a part of a digital flow controller, more specifically for a wire of a line.

Figure 11B:
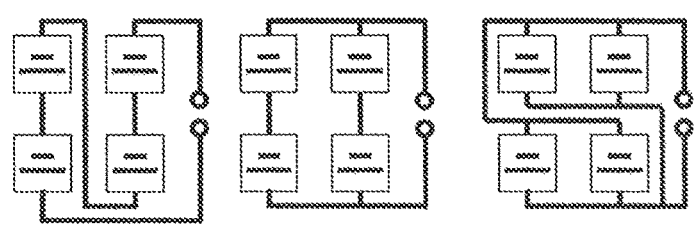
FIG. 11b) is a diagrammatic representation of the switching states of the coupling field of FIG. 11a)

FIG. 11b) is a diagrammatic view showing that all possible variants of series and parallel circuits can be implemented with this arrangement. This form of coupling field is scalable in relation to the number of terminals for sources and sinks, wherein the complication and effort involved therewith rises substantially linearly with an increasing number of sources and sinks.

Figure 12:
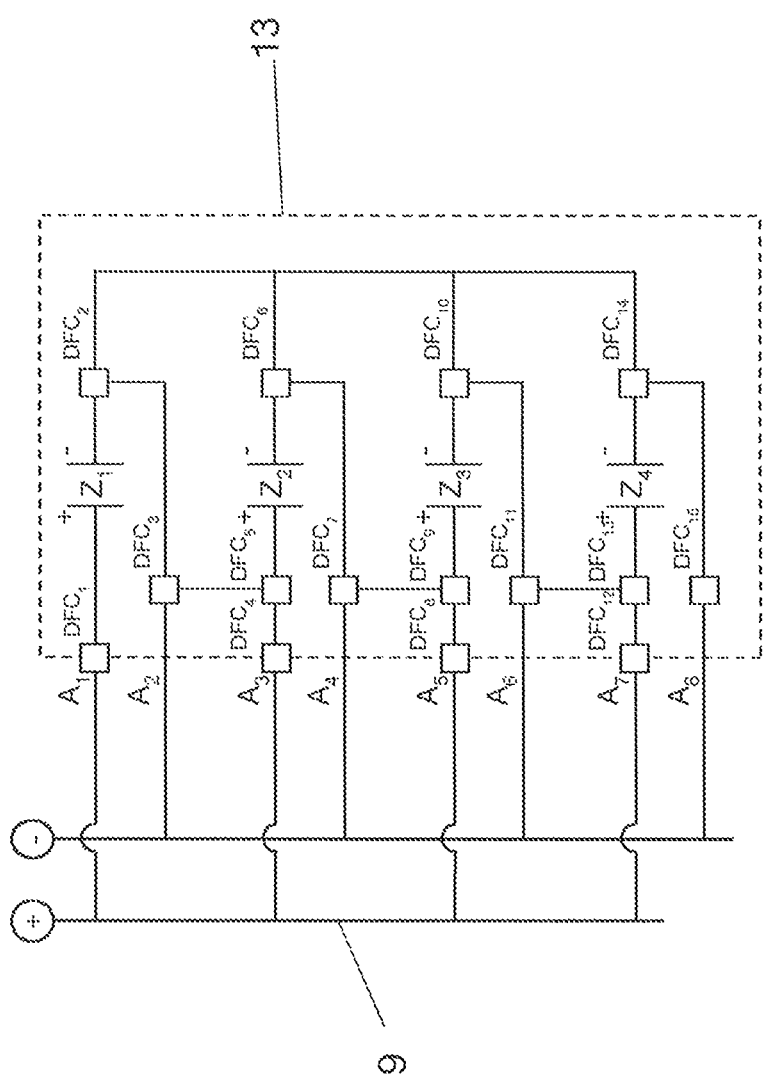
FIG. 12a) is a diagrammatic representation of a distributor circuit according to an embodiment of the present invention with a passive bus bar and a so-called physical abstraction layer.
FIG. 12b) shows a schematic circuit diagram of a DFC as shown in FIG. 12a)

Between the embodiment of the power distributor of FIG. 7 and the embodiment of FIG. 10, in regard to complexity of the circuitry, there is an embodiment as will now be additionally described with reference to FIGS. 12 and 13.

If, for example, a plurality of sources are to be connected in serial relationship to a bus bar, then the bus bar must be actively switched, that is to say, a coupling field as was described hereinbefore. To reduce complexity, however, the sources can be combined to form their own network, a so-called physical abstraction layer. That physical abstraction layer 13, as shown in FIG. 12a, is connected to the bus bar 9 by way of many terminals A1 through A8.

The physical abstraction layer 13 serves to connect the sources Z1 through Z4 in parallel and serial relationship. Each individual source can thus be connected to bus bar 9. Sources Z1 through Z4, which follow each other, can be connected to the bus bar in parallel and serial relationship. Sources Z1 through Z4 can also be connected by leaving out other sources Z1 through Z4. The consequence of this however is that the sources which are skipped cannot be further used. Any series and parallel circuitries in respect of the sources Z1 through Z4 can be implemented by suitable circuitry for the DFCs.

Reference is now made to FIG. 12a) to describe how sources $Z_1$ and $Z_2$ as well as the sources $Z_3$ and $Z_4$ can be connected in series. The series-connected sources Z1 and Z2 are connected by way of the terminals A1 and A4 in parallel and by way of the terminals A5 and A8 to which the series-connected sources Z3 and Z4 are connected to the corresponding current conductors of bus bar 9. The digital flow controllers $DFC_1$ through $DFC_{15}$ in the diagrammatic view in FIG. 12a) each have three terminals. This involves an equivalent circuit diagram, the precise configuration of which is shown in FIG. 12b). The equivalent circuit diagram of the 2×1 DFC of FIG. 12a) is shown on the left-hand side of FIG. 12b), while the actual circuitry is shown on the right-hand side. When the situation is considered more closely the DFC is implemented with three terminals as shown at the right in FIG. 12b) by a DFC whose output is connected to two parallel-connected switches $S_1$, $S_2$, wherein both the DFC and also the two switches $S_1$, $S_2$ are connected to the control means 2300 of the power distributor 2000 and are controlled by same.

Figure 13:
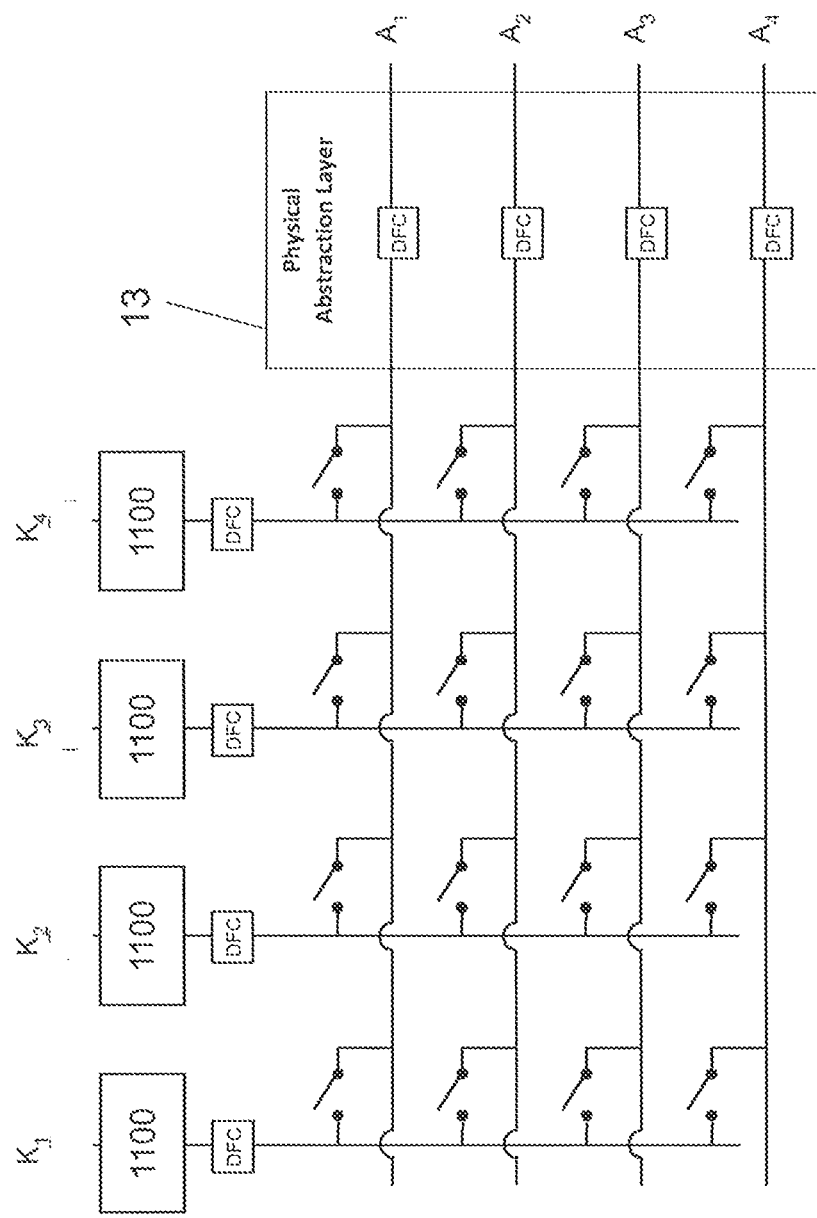
FIG. 13 is a schematic circuit diagram of a distributor circuit according to a further embodiment of the present invention with a coupling field and a so-called physical abstraction layer.

FIG. 13 diagrammatically shows the linking of a physical abstraction layer 13 to an active, that is to say, switched, coupling field. In this case the coupling field is a coupling field with simple on/off switches S, as were already described for the coupling field in FIG. 10.

Connection control of the distributor circuit 2100 is effected by the control means 2300 of the power distributor. In that case the control means 2300 and the controllers of the sources and sinks 1200, 3200 form a logical plane which is also referred to as the control plane. The functions of that control plane are in particular:

Communication of the controllers with each other,
Processing and storage of the prevailing power, voltage, and current strength measurement values,
Storage of the information about the current states of the individual sources,
Actuation and control of the DFCs so that the corresponding sources are connected to the corresponding sinks,
Management and configuration of the coupling fields,
Determining the load resistances of the sources 1000,
Determining other parameters like temperature, number of cycles, aging of the sources, and energy storage means,
System monitoring,
Communication with higher-order systems,
Acceptance and processing of external schedules for planable power flows,
Demanding power for recharging energy storage means connected to the power distributor,
Handling spontaneous power delivery and consumption,
Determining suitable sources for meeting the demand by means of the orchestration algorithm,
Establishing process implementation for the source and DFC circuitry and open-loop and closed-loop control of the DFCs involved,
Process implementation and source determination is iteratively optimized,
Source management: demand in respect of external power for recharging and for internal re-storage and selection of defective sources,
Microaccounting and CDR production for billing,
Reporting in regard to the provision of positive and negative control energy,
Bridging over supply gaps in the event of short-term reordering of power. In other words during a consumption process a sink establishes that the packet ordered was too small, so it makes a re-order. As that re-ordered power can generally only be delivered with a time delay, but an interruption in the process is highly damaging, that gap is bridged over by the power distributor. For that purpose it receives the corresponding power demand from the sink,
Communication with all elements of the electricity grid.

Distribution of the power flows P(t) of the sources 3000 to the power flows P(t) of the sinks 1000 by the power distributor 2000 will now be described with reference to FIG. 14. Shown therein by way of example are the power profiles of three sources Z1 through Z3 and the power profile of a sink S1 for four time periods dt. Each of the power profiles P(t) is established by means of elementary power units dP which have a constant power over a time period dt, wherein the power at a moment in time is equal to an integral multiple of the elementary power unit dP. In that respect, in the view shown in FIG. 14, the time periods dt are precisely so selected that they correspond to the time duration dt of an elementary power element dP.

The source controller reports periodically or on demand the information about its current charge state but also temperature, ageing or the number of charge cycles which have already taken place (for the situation where the source is a battery), in the form of a state matrix M_i of the associated source Z_i to the control means 2300 of the power distributor 2000. Those state matrices are then stored in the control means 2300.

The state matrix is always a section through the high-dimensional characteristic diagram and is formed for fixed load resistance values, temperature values and so forth.

The controllers 1200 of the sinks 1000 only pass demand profiles $P_{dem}(t)$ with a time stamp to the control means 2300. The load resistance of the sinks 1000 to be supplied is now estimated or ascertained by means of a measuring head in the power terminals 1100 of the sinks 1000. The control means knows the characteristic diagrams of the sources 3000 and thus the dependency of the states, for example, on the load resistance. The current state matrices are then corrected in accordance with the effect of the individual load resistances. In particular, for example, the discharging time of a storage capacitor used as a source is altered in dependence on the load resistance which is in total connected thereto.

As the next step the control means 2300 ascertains suitable sources 3000 so that, at any time, the total of the power provided by the individual sources 3000 is equal to the total of the power demanded by the sinks. FIG. 14 shows that distribution function in simplified form insofar as only a single sink has to be supplied, whose demanded power profile $P_{dem}(t)$ is shown at the bottom in FIG. 14.

Figure 14:
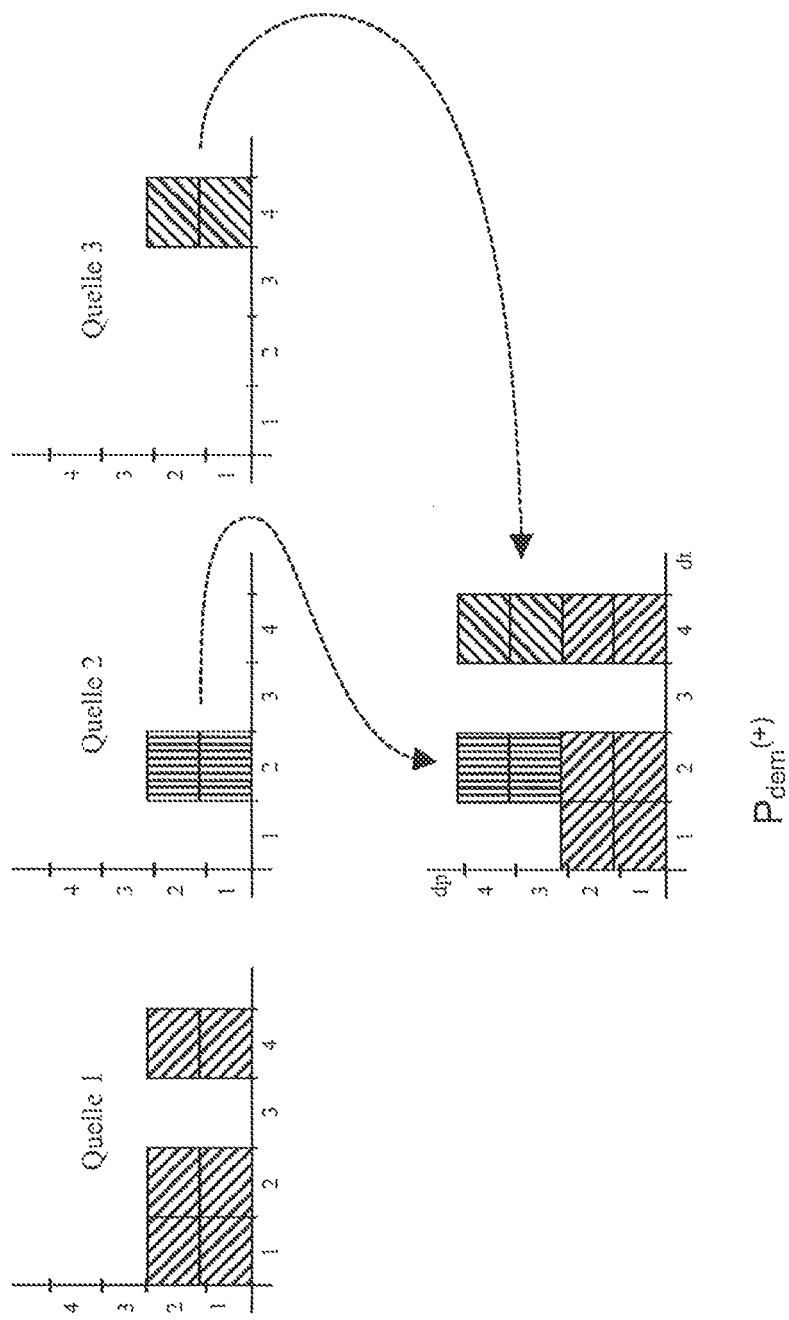
FIG. 14 shows a diagrammatic representation by way of example of the distribution of elementary power units of three sources to a sink.

That demanded power profile from the sink is now composed of the three power profiles shown in the upper part of FIG. 14.

In the first and second periods, z_11 and z_12, two elementary power units dP are respectively taken from the source Z1. In addition, for the second period two elementary power units dP are also taken from the source 72, so that in the second period control can be made available by the series connection of the two sources Z1 and Z2 for the time duration di overall in respect of four elementary power units dP. No power is required for the third period. In the fourth period the source Z1 and the source Z3 respectively supply two elementary power units dP.

The algorithm as part of the orchestration algorithm for assembling the demanded power profile is based on a packeting problem. In that case the demanded power profile forms the pack space and the digitized power profiles of the sources provide the packets. Added to that is the boundary condition that the packets both at the source side and also at the sink side have a predetermined time sequence.

Such a packeting algorithm, as part of the orchestration algorithm, can look like the following:

Let $A_{k_t}$ be the value of the k-th demand profile and $Z_{j_t}$ be the value of the maximum power of the j-th source during the t-th time slice.

We begin with the situation where there is only one simultaneous demand k=1:

calculating during each time slice t and for all sources j the difference:

$$\Delta_{1_{j_t}} = A_{1_t} - z_{j_t}, \qquad \text{Eq. 7}$$

if $\Delta_{1_{j_t}} \leq 0$, already applies for a single source j, then the demand could be met from a source, the calculation terminates and the residual value of the source is updated by the taken value $z_{j_t} := z_{j_t} - A_{1_t}$, plus possible further correction terms for further time slices dependent on the type of source.

if a single source j does not fulfil the demand, checking whether there are two sources j and i so that with $\Delta_{1_{j_t}} = A_{1_t} - (z_{j_t} + z_{i_t})$, $\Delta_{1_{j_t}} \leq 0$ applies. In that case the residual values of both sources are updated, if the demand cannot be fulfilled even with two sources the attempt is made with three, with four, and so forth.

If two or more demanded power profiles of the sinks are to be met with such an algorithm, then two or more calculations are carried out in parallel. In that case the one calculation begins with the first source and the second calculation with the last source. To save time the sources can be partitioned and calculations can begin in parallel for the partitions. For that purpose there must be a higher-order control and procurement mechanism. If the calculations are not successful in their partitions then they perform that calculation iteratively in the next one. If a calculation succeeded in a partition then the value is blocked for other calculations. In the situation where there is only one solution but two or more demanded power packets and there is no priority which distinguishes one of the demanding sinks then the decision as to which sink is supplied can be decided randomly or the existing power profiles of the sources are distributed uniformly to all sinks.

It is to be noted that the demand of a power packet by a sink must be answered in a defined time. In the example considered here this then means that, when demands are to be processed in ten milliseconds, that is to say at 100 Hz, and the CPU is clocked at 1 MHz, the foregoing algorithm must convert the calculation into 10,000 clock cycles of the CPU. That however cannot always be guaranteed. So that the response time is maintained the two best results are then given as the response.

Possible ways of permitting calculation in a predetermined time are for example a power of 2 approach in the digitization of the power profiles, typification and classification of the demanded power profiles, parallelization or communication of typical features.

In particular the demands on short time scales like, for example, grid stabilization, bridging over additional demands and dynamic actuator demands require demand types and classes. This means for these scenarios there are only defined demand profiles. Under some circumstances they can be varied by parameters.

In a further embodiment the sources are categorized in equivalence classes in regard to their power properties, for example, as capacitors, batteries, and so forth. By means of pattern recognition the demanded power profiles of the sinks are analyzed and then those classes are selected from the equivalence classes of the sources, whose power profiles can be most appropriately used in order to synthesize the respective demanded power profile.

In selection of the sources the algorithm also has to deal with the question of whether the demanded power profile is implemented by a series connection of sources (higher voltage and lower currents) or by a parallel connection of sources (lower voltage but higher current).

In producing a power distribution schedule for the power profiles of the sources upon delivery or the power profiles of the sinks, additional parameters can also be taken into account, for example, management specifications based on cyclisation management or non-technical aspects like maintenance agreements of batteries. The demands are therefore to be provided with a relevance. In the simplest case the relevance is represented by a number. The higher the number the correspondingly higher is the relevance. A priority is associated with each relevance and the respective demand is handled with the priority associated with its relevance.

If the packeting function cannot be completely implemented a solution is sought with the smallest deviation or with a predetermined deviation threshold. That delta is then passed to the sink making the demand. That can then change the demand or trigger immediate supply.

Thus, for example, demands for network stabilization are of higher relevance compared to the relevance of demands for bridging over gaps between a power re-order and the actual delivery. A demand of higher relevance is processed with a higher priority. In addition, in an embodiment when the sources involve energy storage means, the sources are attributed with management priorities for operational reasons. For example, a given type of rechargeable battery may be unsuitable for a high access frequency with which only small power packets are fetched, or a rechargeable battery has already reached a higher number of charge cycles compared to another rechargeable battery.

In establishing priority the spatial arrangement of the network should also be taken into consideration. Thus if the relaxation time of a capacitor is changed by virtue of the power resistance, that influences the charging and discharging process.

Known algorithms can be used for finding the way in the distributor circuit. As a departure from the algorithms as are used in coupling fields in communication networks where double usage of paths is prohibited, the number of switching processes is to be reduced for a coupling field for carrying electrical power which serve to supply electrical consumers like households or assemblies of a motor vehicle. This means that multiple use can be advantageous in the context of the power capability of the lines.

Figure 15:
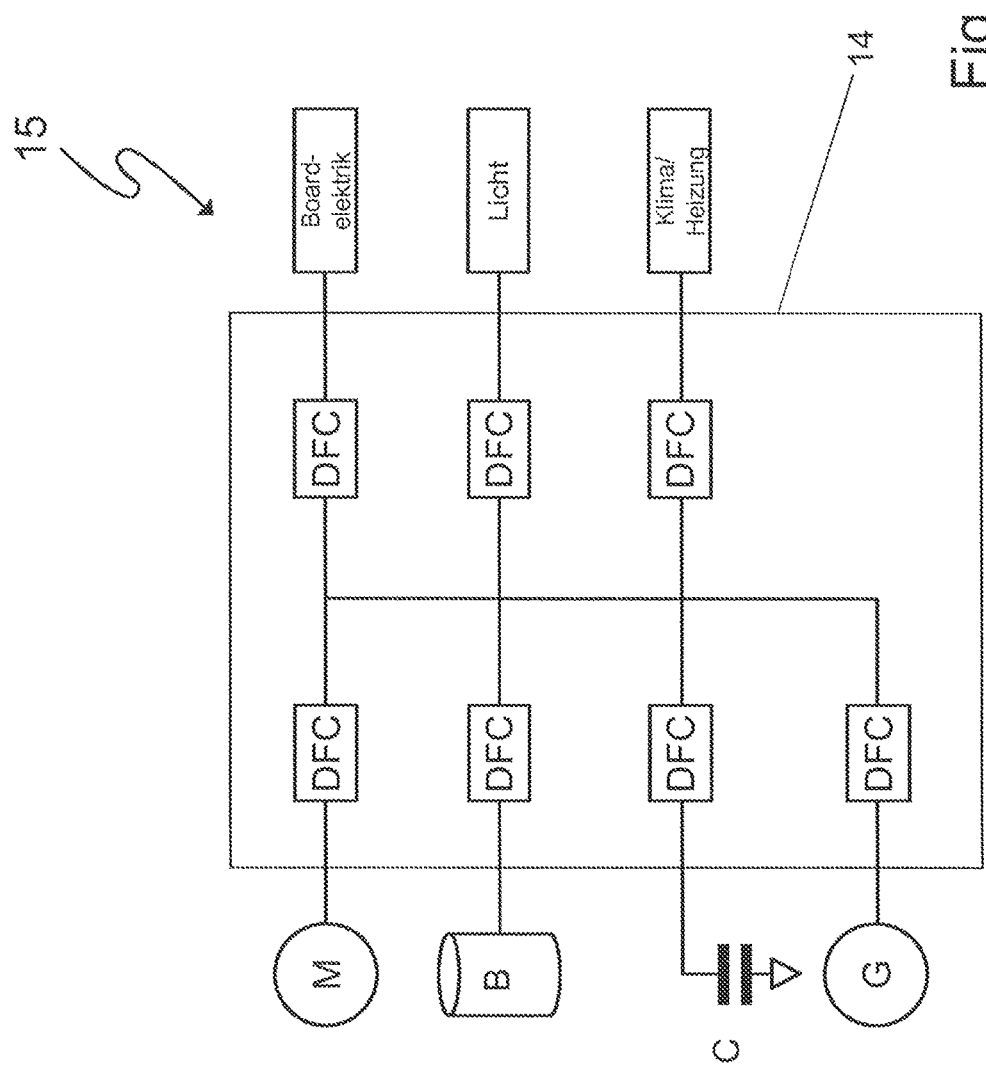
FIG. 15 is a block circuit diagram of an on-board network of a motor vehicle according to an embodiment of the invention.

Reference will now be made to FIGS. 15 and 16 to describe a particularly instructive example for the use of a power distributor according to the invention in the on-board network of an electric motor vehicle.

In electromobility, depending on the respective travel situation and environmental conditions, changing demands are made in terms of current and voltage supply of different consumers. Heating, headlights, electroviscose shock absorbers, wheel hub motors: each consumer has different characteristics and, depending on the respective combination and time pattern, there is a complex dynamic in terms of the demands for current and voltage. Traction batteries are not suitable for on-board electronics, starter batteries are not suitable for heating. None of them is suitable for receiving braking energy obtained by recovery, storage capacitors would be better for that purpose.

FIG. 15 diagrammatically shows the structure of an on-board network of an electric vehicle. The motor M is an electric motor which is used both for driving the vehicle and also for the recovery of braking energy. The motor is thus either a source or a sink for electrical energy, in dependence on the moment in time t being considered. The generator G is an electrical generator, for example, based on an internal combustion engine or a fuel cell, whose primary energy carriers are kept in a separate tank. Batteries B and capacitors C can also absorb or provide power, depending on the set direction of flow in the DFC.

The structure of the distributor circuit corresponds to the structure shown in FIG. 10. The decisive feature of the DFCs is that, in the on-board network, by targeted production of a potential difference between at least two terminals, a defined flow of current and thus a defined flow of power is to be produced between the terminals. By the inclusion of those active elements Kirchhoff's laws are applicable only in portion-wise and time-wise fashion and lose their applicability in terms of the overall determination of the power flows in this network. The DFCs are linked together by way of the control means of the power distributor and are used for orchestration of the individual sources and sinks and the energy flows between them.

Control of the power flows between the DFCs involved and thus the distribution of the power profiles to the terminals of the distributor circuit will now be illustrated by means of an acceleration process. A constant speed with a constant power demand is presupposed as the starting situation. Additional power is required for acceleration. That is to be interpreted as additively to the existing power which is being provided constantly. Additional power can only be provided more specifically in the very short term, that is to say, in quasi real time, as the power demand cannot be predicted by virtue of the very essence of driving a motor vehicle.

FIG. 16 shows the composition of the power profile demanded by the motor M and then provided to same, with initiation of the sudden acceleration at the time Lt. The power provided for that purpose is composed of three different components which are delivered by three different sources. The envelope of the power profile P(t) is the same as the power required for the abrupt increase in speed.

For t<t0 the generator G supplies a power profile for the electric motor M. The power profile for the power demanded by the electric motor as a sink connected to the power distributor is generated by the accelerator pedal of the vehicle and is transmitted in the form of data to the control means of the power distributor. In that case the electric motor operates at a defined working point which is distinguished by a high level of efficiency. That power profile represents a kind of "base load." For t>t0 the acceleration process is initiated. The motor demands the maximum total power. In this phase an additional power profile is provided by the capacitor bank C as that can deliver the greatest power gradient.

The energy content of the capacitor bank C however is not sufficient for the entire acceleration process, and therefore a supplemental power flow is demanded from the traction battery B.

After the target speed is reached a higher power is demanded from the generator G as the required base load has risen and, for example, the power which can be provided at a maximum by the traction battery is too low. For that purpose the generator changes to another working point, for the attainment of which it requires a certain time, as it has a shallower gradient than, for example, the capacitor bank C.

LIST OF REFERENCES NUMERALS

DFC digital flow controller
1 bidirectional boost/buck converter
2 DC/DC converter
3 measuring device
4 computer unit
5 control line
6 control line
7 measurement line
8 IP network
9 passive bus bar
10 sources
11 terminal
12 switch
13 physical abstraction layer
14 distributor circuit
15 on-board network
1000 sink
1100 electrical terminal of the sink
1200 controller
1300 consumer
2000 electrical power distributor
2100 distributor circuit
2200 communication device
2300 control means
3000 source
3100 electrical terminal of the source
3200 controller
3300 generator
10000 electricity grid

The invention claimed is:

1. An electrical power distributor for an electricity grid comprising:
an electrical distributor circuit having at least three terminals, wherein sources and sinks for electrical energy can be connected to the terminals, wherein the three terminals are electrically connected together in such a way that an electric current can flow from each of the terminals to each of the other terminals, and wherein each of the terminals has a respective power controller which is so adapted that in operation of the power distributor the electric power P(t) flowing by way of the respective terminal can be adjusted in dependence on time t;
a communication device which can be connected to a data network and which is so adapted that in operation of the power distributor it receives data from the sources or sinks; and
a control means for controlling a distribution of a flow of the electric power P(t) in dependence on time t at the terminals,
wherein the control means is connected to the communication device in such a way that the data received from the communication device can be processed by the control means;
wherein the control means is connected to each of the power controllers wherein the control means is so adapted that in operation of the power distributor it calculates the electric power P(t) flowing by way of each of the terminals in dependence on the data received from the sources or sinks; and
wherein the control means is so adapted that in operation of the power distributor it controls the electric power P(t) flowing by way of the respective terminal in dependence on time t.

2. The power distributor as set forth in the claim 1, wherein the control means is so adapted that in operation of the power distributor for each moment in time t it calculates the electric power P(t) flowing by way of each of the terminals from the electric power $P_{max}(t)$ which can be provided at a maximum at the time t by each source, and the electric power $P_{dem}(t)$ required at the time t by each sink, and it controls the power controller in such a way that the calculated electric power P(t) is adjusted at the time t at the respective terminal.

3. The power distributor as set forth in claim 1, wherein the distributor circuit includes a coupling field.

4. The power distributor as set forth in claim 3, wherein the nodes of the coupling field are formed by controllable power controllers.

5. The power distributor as set forth in claim 1, wherein the distributor circuit has a first and a second portion, wherein the first portion includes a coupling field which is so designed that all terminals of the first coupling field which can be connected to a source or a sink can be connected in parallel or in series relationship to the second portion of the distributor circuit.

6. The power distributor as set forth in claim 1, wherein each of the terminals has a voltage converter and/or each of the terminals has a measuring device for detecting an actual electric power flowing by way of the terminal and/or a control means, wherein the control means is so adapted that it provides for closed-loop control of the actual power by way of the terminal in such a way that it is equal to the calculated power P(t).

7. The power distributor as set forth in claim 1, wherein the control means is so designed and adapted that in operation of the power distributor it approximates the power P(t) in dependence on the time t at each of the terminals as an integral multiple of an elementary power dP, wherein dP is constant over a period of time dt.

8. The power distributor as set forth claim 1, wherein the control means is so designed and adapted that in operation of the power distributor it approximates the power P(t) in dependence on time t at each of the terminals as the formula:

$$(t) = \sum_{k=0}^{n} 2^k dP.$$

9. The power distributor as set forth in claim 1, wherein the control means is so adapted that in operation of the power distributor it apportions digitized electric powers P(t) flowing by way of each of the terminals connected to the source to the electric powers P(t) flowing by way of terminals connected to a sink, wherein the following steps are carried out:

calculating for each time slice t and for all sources j the difference:

$\Delta_{1,j_t} = A_{1_t} - z_{j_t};$ if $\Delta_{1,j_t} \leq 0$, already applies for a single source j, then the demand from a single source can be fulfilled, the calculation terminates and the residual value of the source is updated by the taken value $z_{j_t} := z_{j_t} - A_{1_t}$, and preferably further correction term time slices dependent on the type of source;

if a single source j does not fulfil the demand, checking whether there are two sources j and i so that with $\Delta_{1,j_t} = A_{1_t} - (z_{j_t} + z_{i_t})$, $\Delta_{1,j_t} \leq 0$ applies, and if that condition is fulfilled updating of the residual values of both sources so that $z_{j_t} := z_{j_t} - A_{1_t}$, respectively applies for both sources;

if the demand cannot be fulfilled even with two sources repeat step 2 with three and more sources;

wherein $A_{k_t}$ is the value of the k-th demand profile and $Z_{j_t}$ is value of the maximum provided power of the j-th source during the t-th time slice.

10. The power distributor as set forth in claim 1, wherein the control means is so designed and adapted that in operation of the power distributor it controls the current flow on the assumption of elementary energy packets with an energy dP×dt.

11. The power distributor as set forth in claim 1, wherein the control means is so designed and adapted that in operation of the power distributor it controls the power controller in such a way that at any time t the electric power P(t) provided at a terminal connected to a sink is the same as the power $P_{dem}(t)$ required by the sink at that time.

12. The electrical power distributor as set forth in claim 1, and further comprising an electrical energy storage means which is so adapted that in operation it can receive, store, and/or deliver electrical energy;

wherein the energy storage means is electrically connected to one of the terminals of the power distributor;

wherein the energy storage means is so adapted that based on information about a current state of the energy storage means the maximum electric power $P_{max}(t)$ which can be provided by the energy storage means at a future time t and a power input $P_{cap}(t)$ at a maximum at a time t can be calculated; and wherein the control means is so designed and adapted that in operation of the power distributor in the calculation of the electric power P(t) flowing by way of each of the terminals at a time t the maximum electric power $P_{max}(t)$ which can be provided by the energy storage means at that time t or the power input $P_{cap}(t)$ possible at that time t of the energy storage means is taken into account.

13. An electricity grid comprising an electrical power distributor as set forth in claim 12, the electricity grid comprising:

a data network connected to the communication device of the power distributor;

at least one source for electrical energy;

wherein the source is electrically connected to one of the terminals of the power distributor;

wherein the source is so adapted that based on information about a current state of the source the electric power $P_{max}(t)$ which can be produced at a maximum by the source (3000) at a future time t can be calculated;

wherein the source has a communication device which is connected to the data network and which is so adapted that in operation of the data network it transmits data with information about a current state of the source and/or with information about the electric power $P_{max}(t)$ which can be provided at a maximum at a future time t to the communication device of the power distributor; and at least one sink for electrical energy, wherein the sink is electrically connected to one of the terminals of the power distributor; and wherein the sink has a communication device which is connected to the data network and which is so adapted that in operation of the electricity grid it transmits data with information about an electric power $P_{dem}(t)$ required by the sink at a future time t to the communication device of the power distributor.

14. The electricity grid as set forth in claim 13, wherein the source and the sink are connected to the power distributor by way of an overhead line, a ground line, or an underwater line, or the electricity grid is an on-board network (15) of a vehicle, an aircraft, or a ship.

15. The electricity grid as set forth in claim 13, wherein the energy storage means and the source have a mutually different power profile $P(t)$.

* * * * *